(12) United States Patent
Bekhtur et al.

(10) Patent No.: US 11,300,476 B2
(45) Date of Patent: Apr. 12, 2022

(54) SYSTEM AND METHOD FOR ALTERNATING-DIRECT HIGH VOLTAGE LEAK DETECTION

(71) Applicant: Packaging Technologies & Inspection, LLC, Tuckahoe, NY (US)

(72) Inventors: Undrakh Bekhtur, Eastchester, NY (US); Charles Stauffer, Berkeley, CA (US); Heinz Wolf, Hackettstown, NJ (US); Oliver Stauffer, Tuckahoe, NY (US)

(73) Assignee: PACKAGING TECHNOLOGIES & INSPECTION, LLC, Hawthorne, NY (US)

( * ) Notice: Subject to any disclaimer, the term of this patent is extended or adjusted under 35 U.S.C. 154(b) by 0 days.

(21) Appl. No.: 17/065,607

(22) Filed: Oct. 8, 2020

(65) Prior Publication Data

US 2021/0072112 A1 Mar. 11, 2021

Related U.S. Application Data

(62) Division of application No. 16/074,146, filed as application No. PCT/US2016/056976 on Oct. 14, 2016, now Pat. No. 10,859,464.
(Continued)

(51) Int. Cl.
*G01M 3/40* (2006.01)

(52) U.S. Cl.
CPC .................... *G01M 3/40* (2013.01)

(58) Field of Classification Search
CPC ........ G01M 3/40; G01M 3/187; G01N 27/61; G01N 27/24; G01N 27/60; A61M 5/3129
See application file for complete search history.

(56) References Cited

U.S. PATENT DOCUMENTS

| 4,125,805 A | 11/1978 | Nagamatsu et al. |
| 4,243,932 A | 1/1981 | Kakumoto et al. |

(Continued)

FOREIGN PATENT DOCUMENTS

| DE | 3204762 A1 | 8/1983 |
| JP | 53-086294 A | 7/1978 |

(Continued)

OTHER PUBLICATIONS

Supplementary European Search Report for Europe U.S. Appl. No. 16/889,637 dated Aug. 15, 2019, 2 pages.
(Continued)

*Primary Examiner* — Alesa Allgood
(74) *Attorney, Agent, or Firm* — Benesch, Friedlander, Coplan & Aronoff LLP

(57) ABSTRACT

A method and device for determining the existence of a leak in a package includes generating an AC high voltage with DC high voltage offset in a circuit. A package is placed between an inspection electrode and a detection electrode, which are located within the circuit. The inspection electrode applies the AC high voltage with the DC high voltage offset to the package. Current flow through the package is then detected by the detection electrode. A detection board then processes the current flow and sends the processed signal to a programmable logic controller which determines if a leak is present in the package. If a leak is present, a signal is sent to a display to notify a user.

12 Claims, 15 Drawing Sheets

Related U.S. Application Data

(60) Provisional application No. 62/317,873, filed on Apr. 4, 2016, provisional application No. 62/289,579, filed on Feb. 1, 2016.

(56) References Cited

U.S. PATENT DOCUMENTS

| | | | |
|---|---|---|---|
| 5,010,761 A * | 4/1991 | Cohen | G01M 3/229 73/40.7 |
| 5,628,309 A | 5/1997 | Brown | |
| 6,288,554 B1 | 9/2001 | Yasumoto et al. | |
| 6,352,523 B1 | 3/2002 | Brown et al. | |
| 6,634,216 B1 * | 10/2003 | Yasumoto | G01N 27/61 73/49.3 |
| 6,636,031 B1 | 10/2003 | Kenmochi et al. | |
| 7,148,659 B2 | 12/2006 | Lanni | |
| 7,251,986 B2 | 8/2007 | Ishida | |
| 8,641,977 B2 | 2/2014 | Snowball | |
| 2006/0170371 A1 | 8/2006 | Lyle et al. | |
| 2007/0177129 A1 | 8/2007 | Kothari et al. | |
| 2010/0097733 A1 | 4/2010 | Tomimbang | |
| 2014/0225625 A1 | 8/2014 | Wei et al. | |

FOREIGN PATENT DOCUMENTS

| | | |
|---|---|---|
| JP | S53-086294 | 7/1978 |
| JP | 54-115186 A | 9/1979 |
| JP | S54-115186 | 9/1979 |
| JP | 59-125035 A | 7/1984 |
| JP | S59-125035 | 7/1984 |
| JP | 59-195140 A | 11/1984 |
| JP | S59-195140 | 11/1984 |
| JP | 62-070725 A | 4/1987 |
| JP | S62-070725 | 4/1987 |
| JP | 06-331582 A | 12/1994 |
| JP | H06-331582 | 12/1994 |
| JP | 2002-010497 A | 1/2002 |
| JP | 2006-300541 A | 11/2006 |
| WO | 2006021295 A1 | 3/2006 |
| WO | 2014066256 A1 | 5/2014 |
| WO | 2017136007 A1 | 8/2017 |

OTHER PUBLICATIONS

European Search Opinion for Europe Patent Application No. 16889637.1 dated Aug. 15, 2019, 4 pages.
International Search Report dated Apr. 24, 2019, for International Application PCT/US2019/016820.
Notice of Allowance issued in U.S. Appl. No. 16/074,146, dated Jul. 24, 2020, 27 pages.
Non-Final Office Action issued U.S. Appl. No. 16/074,146, dated May 4, 2020, 39 pages.
Notice of Allowance issued in Japanese Patent Application No. 2018-559666, dated Dec. 25, 2020.
Notification of Reasons for Refusal issued by the Japanese Patent Office in Japanese Patent Application No. 2021-003176 dated Nov. 8, 2021 (8 pages).

* cited by examiner

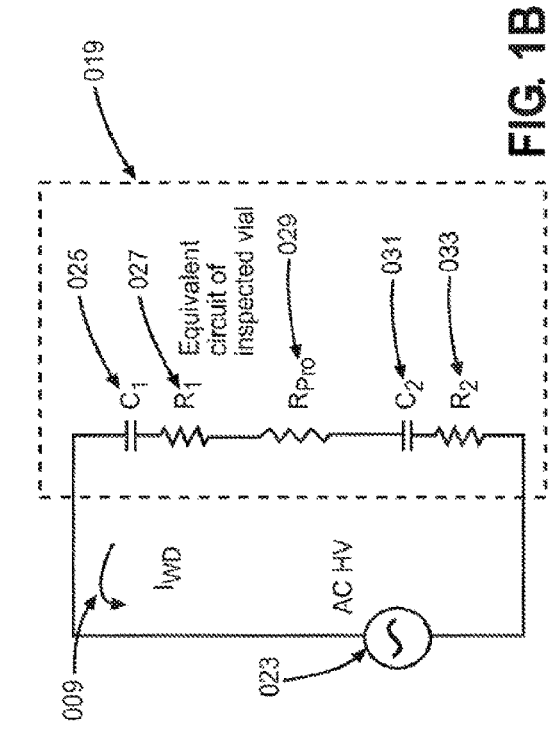
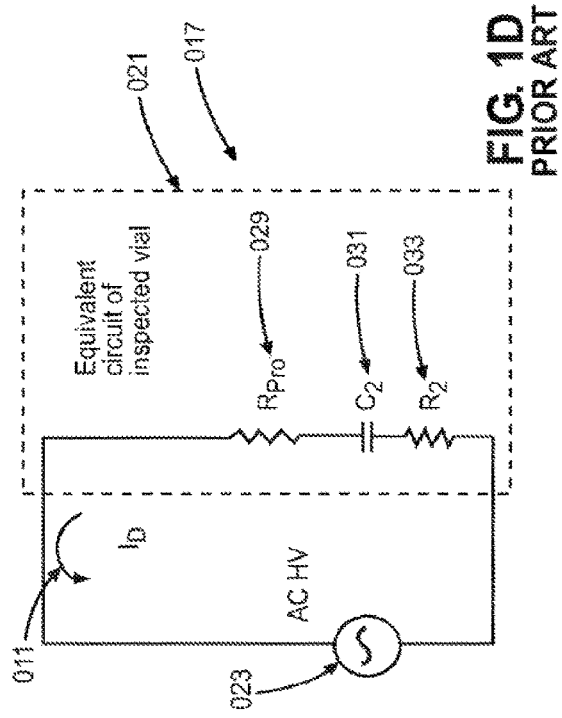
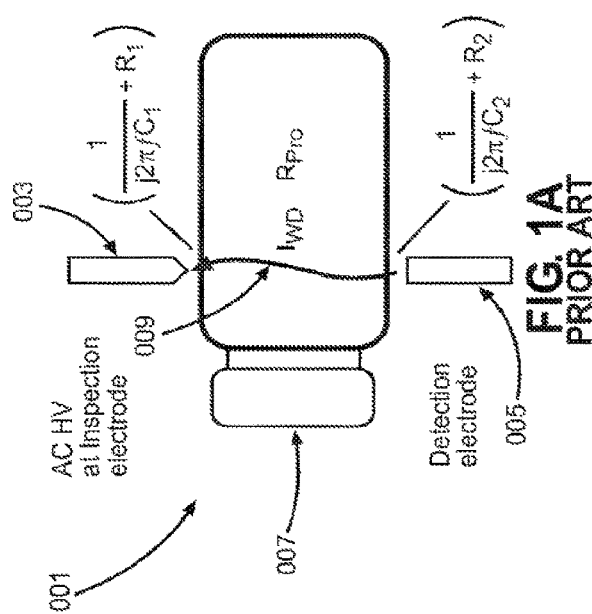
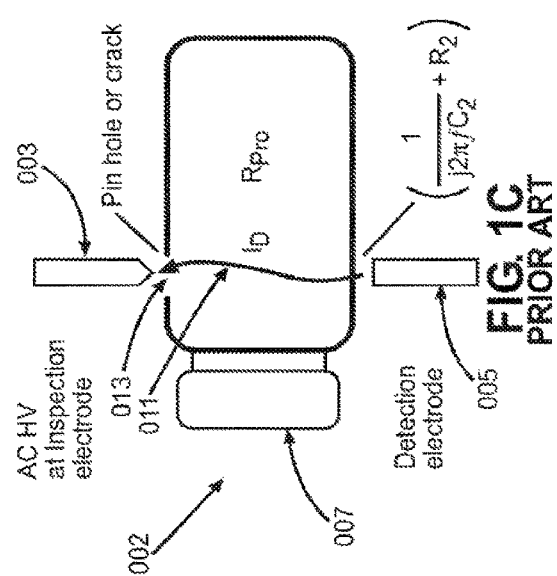

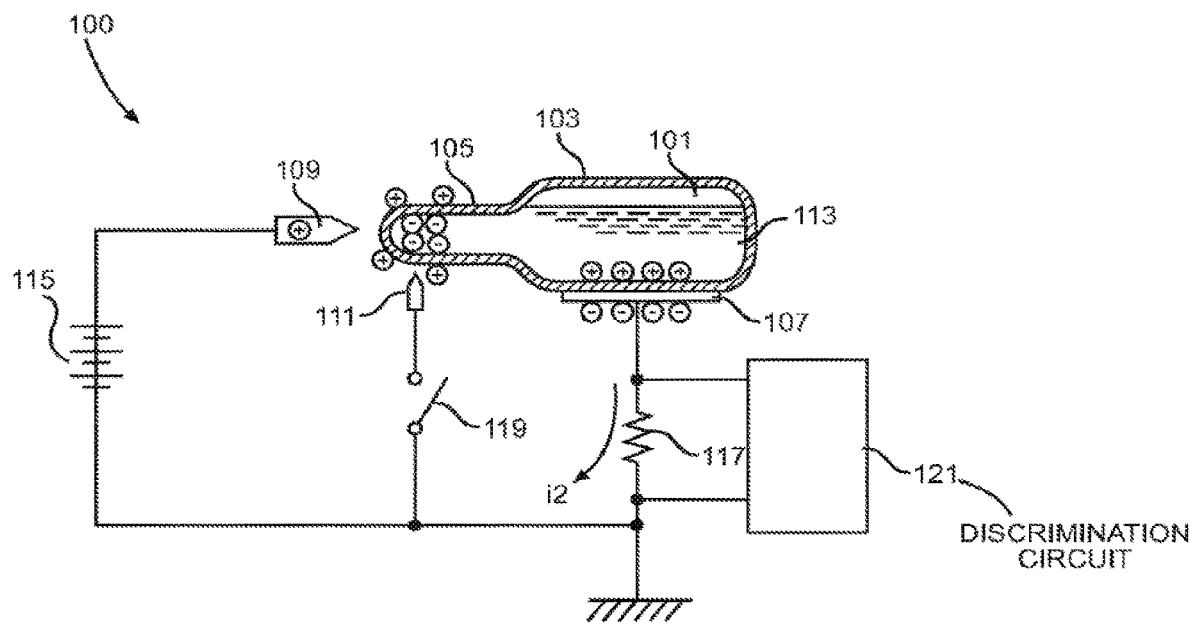
FIG. 2
PRIOR ART
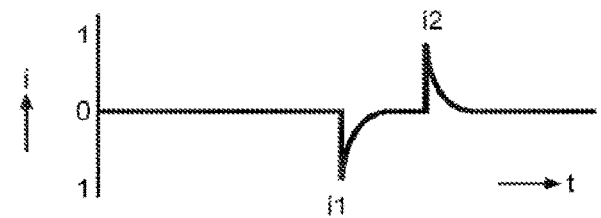
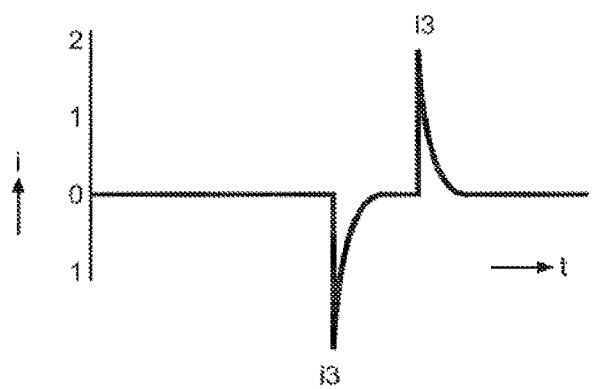
FIG. 3
PRIOR ART

SYSTEM AND METHOD FOR ALTERNATING-DIRECT HIGH VOLTAGE LEAK DETECTION

CROSS-REFERENCE TO RELATED APPLICATIONS

This application is a divisional of U.S. patent application Ser. No. 16/074,146, filed Jul. 31, 2018, which is a national stage filing under 35 U.S.C. § 371 of PCT/US16/56976, filed Oct. 14, 2016, which claims the benefit of priority under 35 U.S.C. § 119(e) to U.S. Provisional Patent Application Ser. No. 62/317,873, filed Apr. 4, 2016, which claims the benefit of priority to U.S. Provisional Patent Application Ser. No. 62/289,579, filed Feb. 1, 2016, all the disclosures of which are hereby incorporated by reference in their entirety for all purposes.

TECHNICAL FIELD

The invention relates to the technical field of leak detection, specifically high-voltage leak detection, methods and systems implementing such methods for use in detecting and signaling leaks, tears, breaks, or other imperfections in packaging containers, including, but not limited to, vials, syringes, ampoules, pouches, aluminium pouches, and I.V. bags for sensitive perishable or non-perishable goods.

BACKGROUND OF INVENTION

There are two established techniques for using high-voltage leak detection (HVLD) in the field of leak detection. AC high-voltage leak detection, referred to as conventional HVLD, uses a pure AC current at high voltage values. DC high-voltage leak detection, referred to as DC HVLD, uses a pure DC voltage at high voltage values. While both conventional HVLD and DC HVLD employ high voltage to ultimately detect leaks, the two methods utilize very different techniques based on the inherent differences in AC and DC voltage. Because of these different techniques used by conventional HVLD and DC HVLD, each method has different strengths and weaknesses when it comes to testing certain packaging containers and products contained therein.

For conventional HVLD, AC high voltage is applied to a container to break the resistance of the product and container. The presence of a leak is then determined by detecting the difference of the current through a control container versus the current through the tested container. If the difference is great enough, a leak is determined to be present.

The principle of conventional HVLD is shown in FIGS. 1A-1D. A control vial 001 without defect and filled with a liquid product inspected by conventional HVLD is shown in FIG. 1A. In FIG. 1B, the testing of the control vial of FIG. 1A is shown in a simplified electrical-equivalent circuit. The testing of a defective vial 002 filled with a liquid product is shown in FIG. 1C being inspected by conventional HVLD. FIG. 1D represents the simplified electrical equivalent circuit for the defective vial in FIG. 1C. However it is important to note that the electrical equivalent circuits are based on a simplified model and that more complex models could be created.

As shown in FIGS. 1A and 1C, conventional HVLD testing involves placing a container 007 between two electrodes 003, 005 and applying AC high voltage 023 to the circuit, with one electrode being an inspection electrode 003 and the other electrode being a detection electrode 005. The two electrodes are oriented such that the container to be tested is oriented between the two electrodes without making physical contact with either electrode. The container would then have two specific impedances and a specific resistance: a specific impedance at the container wall across from the inspection electrode $$R_1 + \frac{1}{j\omega C_1},$$

a specific impedance at the container wall across from the detection electrode $$R_2 + \frac{1}{j\omega C_2},$$

and a specific resistance of the product inside the container $R_{pro}$. The resulting current through the non-defective container is represented as $I_{WD}$.

However, if the container should have a leak, a discharge current will flow through a pinhole, crack, or defective seal into the container, as shown in FIG. 1C. A leak in the container will result in the loss of one of the impedances, as shown in FIG. 1D. The resulting current through a defective container will result in a current with different value ($I_D$) due to the loss of the specific impedance. A signal through the product is then detected by the detection electrode. Detecting the change in this current enables the presence of a defect to be recognized as follows:

$$I_{WD} = \frac{AC\,HV}{R_{Pro} + Z_1 + Z_2} \tag{1}$$

Wherein $$Z_1 = \frac{1}{j2\pi f C_2} + R_1 \tag{2}$$

and $$Z_1 = \frac{1}{j2\pi f C_2} + R_2. \tag{3}$$

When a leak is present one of the impedances will be missing. The current through the defective container can be found as follows:

$$I_D = \frac{AC\,HV}{R_{Pro} + Z_1}. \tag{4}$$

A defective container will have a larger electric current present ($I_D$) than a container without defect ($I_{WD}$). The difference between the electric currents determines whether the container is defective, which is shown in the following formula:

$$\Delta I = I_D - I_{WD} \tag{5}.$$

It is important to note that the $C_1$, $R_1$, $C_2$, $R_2$, $R_{Pro}$, are variables and change depending on the amplitude of the applied AC high voltage, material characteristics (such as dielectric strength of the container and liquid product), and the conductivity of the liquid product. The higher the applied voltage, the lower the impedances of $C_1$, $R_1$, $C_2$, $R_2$, $R_{Pro}$. The risk of applying too large of a voltage is that applied high voltage may create an arc or spark over the impedances listed above and cause what appears as a false leak. Therefore it is necessary in conventional HVLD technology to reach the highest possible voltage, in order to get better sensitivity of the leak detection, without sparking around the container to break down the insulation of the container and the liquid product inside the container. The risk of detecting false leaks using the conventional HVLD is especially high with low-conductivity products.

Beyond the risk of false-positives when used with leak detection, use of conventional HVLD also poses risks to the integrity of the products held within tested containers. The applied pure AC high voltage used in conventional HVLD is able to penetrate through the capacitive impedance of a good container without high attenuation and expose the product within the container to the AC high-voltage directly. This results in potentially harmful and unwanted exposure of the product inside of a good container to high-voltage with unknown side effects. This problem is especially important to the pharmaceutical field, where exposure to high voltage during testing could potentially denature or otherwise harm pharmaceutical products.

Conventional HVLD also faces mechanical disadvantages, as the components necessary to create a testing device employing conventional HVLD are heavy and unwieldy. This makes a conventional HVLD benchtop tool impractical.

Another drawbacks of the conventional HVLD is that it produces excessive ozone during an inspection since AC high voltage creates ozone effectively.

In DC HVLD, a container to be tested for leaks is instead charged purely with DC high voltage. The presence of leaks is determined through the detection of charging and neutralizing currents. The DC HVLD system of Takeda Chemical Industries, as described in U.S. Pat. No. 4,125,805, herein after Takeda, is representative of a typical DC HVLD system.

The Takeda system uses DC high voltage to charge a container, as shown in FIG. 2. The container 105 with fluid product contained within is placed between an anode rod 109, an auxiliary electrode rod 111, and a cathode plate 107. The anode rod 109 is connected to positive side of the DC high voltage source 115. The cathode plate 107 and the auxiliary rod 111 are connected to a negative side of the DC high voltage source 115 through a measuring resistance 117 and a switch 119 respectively as shown in FIG. 2.

When the switch 119 is turned off, the auxiliary electrode 111 is not connected to the negative side of the DC high voltage source 115 then neither electrical charging nor discharging takes place. However if the switch 119 is turned on, the auxiliary electrode 111 is connected to the negative side of the DC high voltage source 115, and a spark discharge occurs between the auxiliary electrode 111 and anode rod 109 which simultaneously causes the electrical charge at the neck portion of the ampoule 105 to be discharged. Meanwhile, a discrimination circuit 121 is used across resistor 117 to detect the potential developed across it.

A neutralizing current it is caused to flow from the auxiliary electrode rod 111 to the cathode plate 107, and is detected by the discrimination circuit 121. The neutralizing current ii normally reaches its maximum value immediately after initiation of the discharge by the auxiliary electrode 111, and subsequently decreases rapidly, as shown in FIG. 3. In the state as described, if the ampoule is a good sample (i.e., free from any defects such as pin holes, etc.), with a predetermined amount of fluid contained therein, the neutralizing current (it) caused to flow obtains a peak value of one unit as shown in FIG. 3.

On the other hand, when the ampoule has a defect, such as a pin hole larger than 2 microns, a neutralizing current $i_3$ of about two units or more is caused to flow, as shown in FIG. 3, where ii is the neutralizing current for containers without defect and $i_3$ is the neutralizing current for containers with defect. FIG. 4 shows an equivalent circuit for the Takeda DC HVLD system shown in FIG. 2.

A major disadvantage of the DC HVLD method and system is the lack of continuity and consistency in testing. In Takeda, the DC HVLD system is a discontinuous test since it is a discontinuous signal which is discretely created and sampled. Each package tested must be charged before being discharged through the discrimination circuit for a single measurement. The charging and discharging of the packages takes place one after another. This makes using the DC HVLD system for an online inspection in a production line almost impossible due to its slow speed and discontinuous nature.

Another disadvantage of the DC HVLD system is the discontinuous nature of the signal applied during testing due to the charging and discharging required. The high voltage discharge used in the DC HVLD system of Takeda can be very stochastic. Since its detected signal is a discrete waveform, the signal in the DC HVLD does not have a certain frequency, phase, or amplitude. The amplitude can vary strongly dependent on the amount of charging and discharging which occurs, and can vary based on the distance between the electrodes and the defect.

Further, the DC HVLD method requires that the anode rod is stationary at top of the package. This technology can be used only for inspection of ampoules. Containers like vials with an aluminum cap or syringes with a metal needle cannot be inspected by the DC HVLD since the metals are highly conductive in comparison to glass or plastic and lead to false positive results.

DC HVLD also requires that the cathode plate is in contact with the package. Contact with packages during testing is undesirable for online testing using rigid electrodes, as such contact is considered to be a destructive method of on-line testing.

SUMMARY OF INVENTION

The current invention solves the problem of sensitive product exposure to high voltage, undesirable levels of ozone production, and false-positive leak detections of conventional HVLD and the structural inflexibility, online inspection limitations, and variability of DC HVLD by applying an AC voltage with a DC high voltage offset to a leak detection, which can be explained by using a simplified electrical equivalent circuits in FIG. 6A to 6D, where the AC current can flow through all components within the circuit while the DC current can only flow through the path without capacitors. However it is important to note that the electrical equivalent circuits are based on a simplified model and that more complex models could be created. The alternating-direct high voltage (ADHV) technique includes placing a container to be tested between a detection electrode and an inspection electrode. A high voltage generation circuit is used for generating a high voltage, the high voltage generation circuit including a pulse autotransformer, a high voltage rectifier, and a high voltage control board. The container is then positioned between the inspection electrode and the detection electrode.

High voltage, AC voltage with DC voltage offset, is then generated through the high voltage generation circuit, such that an electrical current is applied to the container through the inspection electrode and the electrical current through the container is detected by the detection electrode and processed by the detection board. The electrical current through the container can be explained based on electrical equivalent circuits.

The electrical current through the container at the detection electrode is then processed, and a leak in the container is identified through a change in electrical current through the formula $\Delta I = I_D - I_{WD}$, wherein, $$I_D = \frac{AC\ HV}{R_{Pro} + Z_2} + \frac{DC\ HV}{R_{Pro} + R_4}$$

and $$I_{WD} = \frac{AC\ HV}{R_{Pro} + Z_1 + Z_2} + \frac{DC\ HV}{R_{Pro} + R_3 + R_4}$$

$$Z_1 = \frac{\left(\frac{1}{j2\pi f C_1} + R_1\right) * R_3}{\left(\frac{1}{j2\pi f C_1} + R_1\right) + R_3}$$

$$Z_2 = \frac{\left(\frac{1}{j2\pi f C_2} + R_2\right) * R_4}{\left(\frac{1}{j2\pi f C_2} + R_2\right) + R_4}$$

and $I_{WD}$ is current through a container without defect, $I_D$ is current through a defective container. "AC HV" is the AC part of high-voltage. "DC HV" is the DC offset of high-voltage. "$C_1$" and "$R_1$" are specific capacitance and resistance, respectively, of a first wall of container. "$C_2$" and "$R_2$" are specific capacitance and resistance, respectively, of a second wall of container. $R_3$ specific high-Ohm resistance of the first wall of container. $R_4$ specific high-Ohm resistance of the second wall of container. $R_{Pro}$ specific high-Ohm resistance of liquid product inside container. "f" is frequency of AC high voltage.

A preferred embodiment of apparatus for ADHV leak detection includes: an inspection electrode electrically connected to a high voltage rectifier; a first DC voltage power supply electrically connected to the pulse autotransformer, the pulse autotransformer further electrically connected to a high voltage control board, and to a high voltage rectifier; a second DC voltage power supply electrically connected to the high voltage control board, a detection board, a programmable logic controller, and a display to supply them by electric power; and a detection electrode electrically connected to a detection board, the detection board further electrically connected to the programmable logic controller, the programmable logic controller further electrically connected to the display, wherein the detection electrode and the inspection electrode are positioned such that a package fits between the detection electrode and the inspection electrode, and AC high voltage with a DC high voltage offset is applied through the inspection electrode.

A preferred embodiment of a method for ADHV leak detection includes: placing a container between a detection electrode and an inspection electrode connected through a high voltage generation circuit for generating a high voltage, the high voltage generation circuit including a pulse autotransformer, a DC voltage power supply, a high voltage rectifier, and a high voltage control board; creating a capacitive impedance between the product and the detection electrode and between the inspection electrode and the product; generating a high voltage through the high voltage generation circuit, such that an electrical current an electrical voltage is applied to the container through the inspection electrode and the electrical current through the container is detected by the detection electrode and processed by the detection circuit; processing a change in the electrical current through the container at the detection electrode; and identifying a leak in the container through the change in electrical current.

A further understanding of the structural, functional, and advantageous aspects of the disclosure can be realized by reference to the following detailed description and drawings.

BRIEF DESCRIPTION OF DRAWINGS

Embodiments, prior art, and examples are described, by way of example only, with reference to the drawings, in which:

FIG. 1A demonstrates prior art by showing a package without defect tested using a conventional HVLD system;

FIG. 1B shows an equivalent electric circuit of the package and conventional HVLD test circuit of FIG. 1A;

FIG. 1C demonstrates prior art by showing a package with defect tested using a conventional HVLD system;

FIG. 1D shows an equivalent electric circuit of the package with defect and conventional HVLD test circuit of FIG. 1C;

FIG. 2 demonstrates prior art by showing a representation of a DC HVLD system;

FIG. 3 demonstrates prior art by showing a detection signal of the DC HVLD system shown in FIG. 2;

DETAILED DESCRIPTION OF INVENTION

Figure 4:
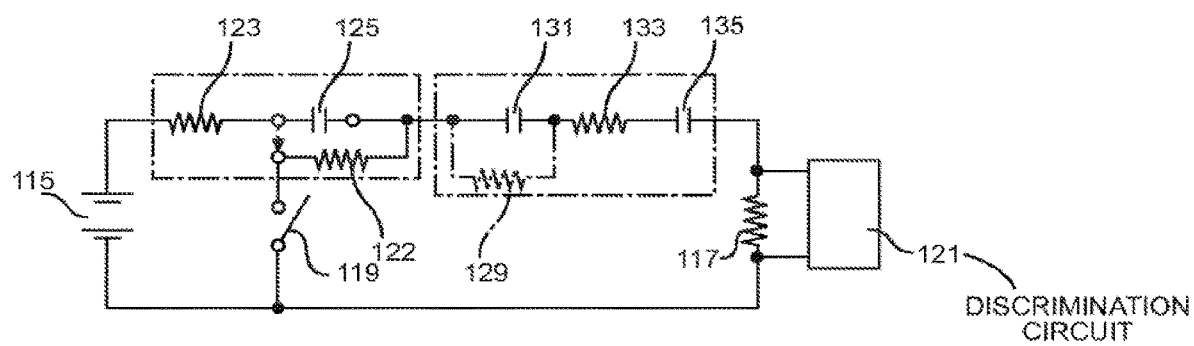
FIG. 4 demonstrates prior art by showing an equivalent electrical circuit of the DC HVLD system of FIG. 2.

Various embodiments and aspects of the disclosure are described with reference to details discussed below. The following descriptions and referenced drawings are illustrative of the disclosure and are not to be construed as limiting the disclosure. The drawings are not necessarily to scale. Numerous specific details are described to provide a thorough understanding of various embodiments of the present disclosure. However, in certain instances, well-known or conventional details are not described in order to provide a concise discussion of embodiments of the present disclosure.

As used herein, the term "ADHV" is short-hand for Alternating-Direct High Voltage relating to the use of an AC high voltage with a DC high-voltage offset.

As used herein, the term "electrically connected" refers to any known method of connecting one or more objects or elements in an electrical circuit such that an electrical signal or electrical current may be transmitted between the objects. Commonly, wire, cables, lines, or similar products are used to electrically connect one or more objects in an electrical circuit.

A preferred embodiment of a method 300 for detecting leaks in packaging includes generating an AC high voltage with a DC high voltage offset in a circuit. A package 305 is placed between an inspection electrode 301 and a detection electrode 303, which are located within the circuit. The inspection electrode 301 applies the AC high voltage 323 with the DC high voltage offset 329 to the package 305. Current flow through the package is then detected by the detection electrode. A detection board then processes the current flow to determine if a leak 311 is present in the package. If a leak is present, a signal is sent to a display to notify a user.

Figure 6B:
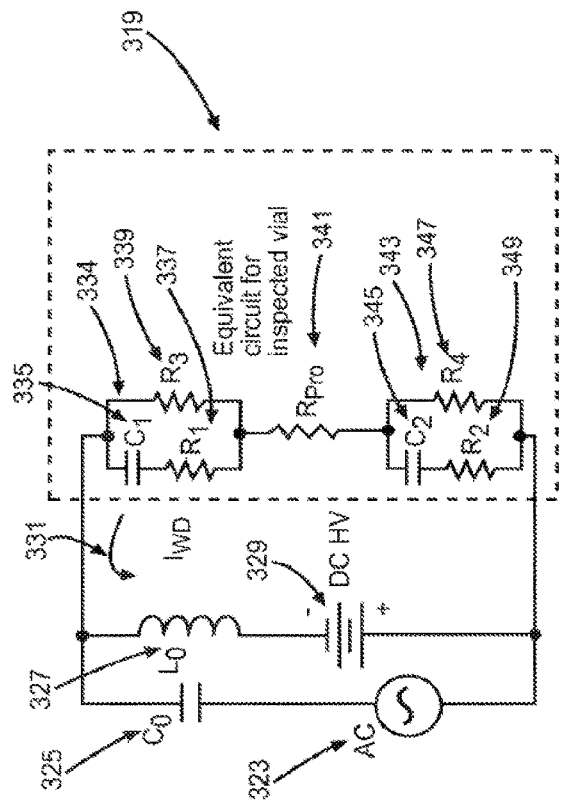
FIG. 6B shows an equivalent electric circuit of the package and ADHV test circuit of FIG. 6A.
Figure 6D:
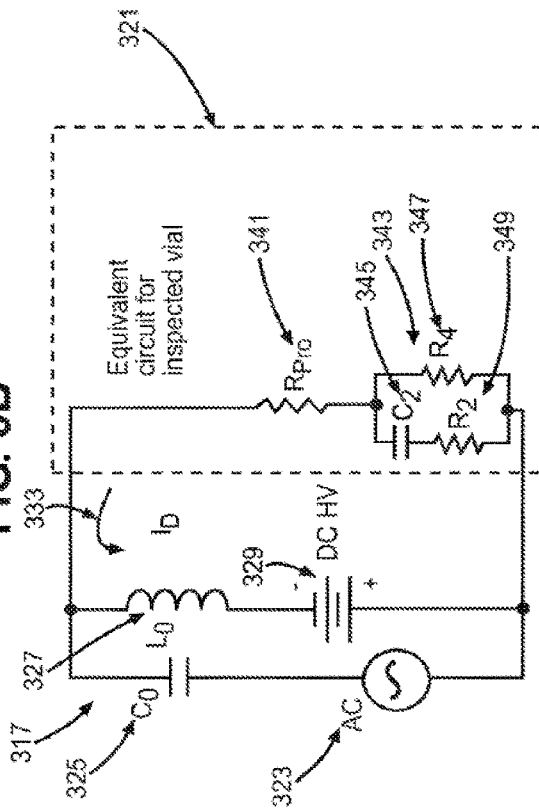
FIG. 6D shows an equivalent electric circuit of the package and ADHV test circuit of FIG. 6C.
Figure 6A:
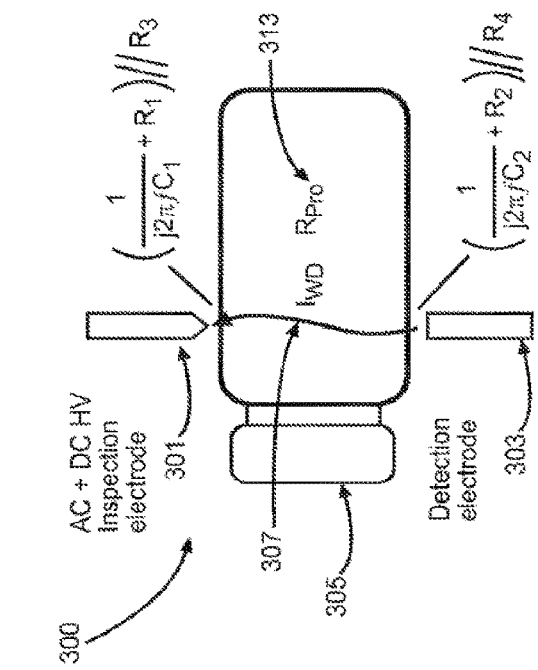
FIG. 6A shows a package without defect tested using an embodiment of the ADHV system.
Figure 6C:
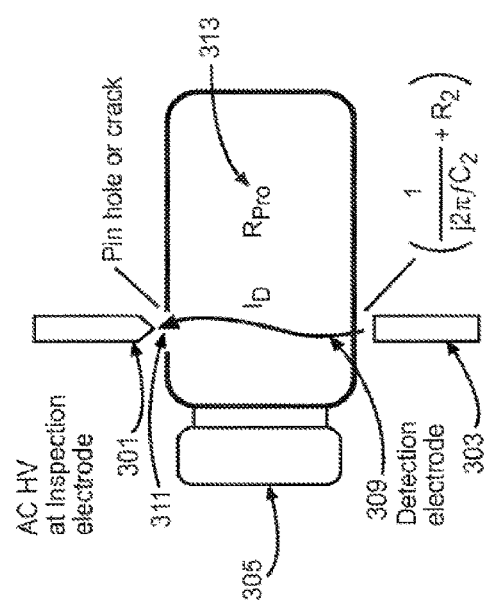
FIG. 6C shows a package with defect tested using a conventional HVLD system.

Multiple figures are provided to demonstrate a method of detecting a leak using the ADHV. FIG. 6A shows a package 305 without defect being tested using the ADHV method. FIG. 6B shows an equivalent electrical circuit representation 319 of the testing in FIG. 6A. FIG. 6C shows a package 305 with defect being tested using the ADHV method. FIG. 6D shows an equivalent electrical circuit representation 321 of the testing in FIG. 6C. For FIGS. 6A-6D, C1 335 represents specific capacitance of a first wall 334 of package, R1 337 represents specific resistance of the first wall of package, C2 345 represents specific capacitance of a second wall 343 of package, R2 349 represents specific resistance of the second wall of package, R3 339 represents specific high-Ohm resistance of the first wall of package, R4 347 represents specific high-Ohm resistance of the second wall of package, RPro 341 represents specific high-Ohm resistance of liquid material inside container, f represents frequency of AC high voltage, Lo represents ideal inductor in the simplified equivalent circuit for blocking AC current, Co represents ideal capacitor in the simplified equivalent circuit for blocking DC current, Iwo represents current 307 through a container without defect, and Io represents current 309 through a defective container. It is important to note that the C1, R1, C2, R2, R3, R4, RPro are variables and change depending on the amplitude of the applied AC high voltage, level of the applied DC high voltage offset, material characteristics such as dielectric strength of the container and liquid product, and the conductivity of the liquid product.

With both AC and DC voltages applied to the circuit, material within the package is only exposed to DC high voltage if a defect exists in the package. Typically, the package is made of an insulator which attenuates the applied DC high voltage strongly.

Since the ADHV method applies both AC and DC voltages, both AC and DC currents flow through the inspected package. In the simplified electrical circuits of FIG. 6B, the AC current can flow through all components in the circuit while the DC current can only flow through the path without capacitors. The total current $I_{WD}$ of the electrical current of FIG. 6B, showing the testing of a package without defect, can be found as sum of AC and DC currents with the following equations:

$$I_{WD} = \frac{AC\,HV}{R_{Pro} + Z_1 + Z_2} + \frac{DC\,HV}{R_{Pro} + R_3 + R_4} \quad (6)$$

wherein, $$Z_1 = \frac{\left(\frac{1}{j2\pi fC_1} + R_1\right) * R_3}{\left(\frac{1}{j2\pi fC_1} + R_1\right) + R_3} \quad (7)$$

and $$Z_2 = \frac{\left(\frac{1}{j2\pi fC_2} + R_2\right) * R_4}{\left(\frac{1}{j2\pi fC_2} + R_2\right) + R_4} \quad (8)$$

Both AC and DC currents flow through a defective package, as well. In the simplified electrical circuits of FIG. 6D, the AC current can flow through all components in the circuit while the DC current can only flow through the path without a capacitor. The total current $I_D$ of the electrical current of FIG. 6D, showing the testing of a defective package, can be found as sum of AC and DC currents with the following equations:

$$I_D = \frac{AC}{R_{Pro} + Z_2} + \frac{DC\,HV}{R_{Pro} + R_4} \quad (9)$$

wherein, $$Z_2 = \frac{\left(\frac{1}{j2\pi fC_2} + R_2\right) * R_4}{\left(\frac{1}{j2\pi fC_2} + R_2\right) + R_4}. \quad (8)$$

If a leak is present in the package, the capacitor $C_1$ will be missing from the electrical circuit and the values of $R_1$ and $R_3$ will be zero. An electrical current through a defective package is therefore greater than an electrical current through a package without defect. The difference between the electrical current through a defective package and the electrical current through a package without defect enables detection of a leak using the following equation:

$$\Delta I = I_D - I_{WD} \quad (10)$$

wherein a leak is present if $\Delta I > 0$.

The AC high voltage with a DC high voltage offset is generated using either a pulse autotransformer or a pulse transformer, high voltage control board, a high-voltage rectifier, and a DC voltage power supply.

The inspection electrode can be rigid, semi-rigid, or flexible in the form of a brush, a rod, steel, or similarly shaped object. Further, the inspection electrode can be made of metals, conductive polymers, or any other kind of conductive material. During application of the AC high voltage with a DC high voltage offset, the inspection electrode can be touching the package or a small air gap can exist between the package and the inspection electrode.

The detection electrode can be rigid, semi-rigid, or flexible in the form of a brush, a rod, steel, or similarly shaped object. Further, the detection electrode can be made of a metal, metal alloys, conductive polymers, or any other kind of conductive material. During detection of the current produced with the AC high voltage with a DC high voltage offset, the detection electrode can be touching the package or a small air gap can exist between the package and the detection electrode.

The package can be in the form of a vial, a syringe, an ampoule, a pouch, a bag, a blow-seal, and any other kind of container made of plastic, glass, aluminum foils, or any other kind of material suitable to be filled with medicinal, food, or similar perishable or sensitive product.

In another embodiment of a method for detecting leaks in packaging, an AC high voltage with a DC high voltage offset is generated in a circuit. A package is placed between an inspection electrode and a detection electrode, which are located within the circuit. The package is rotated along a single axis between the inspection electrode and the detection electrode. Further, the inspection electrode and detection electrode moved along the length of the package as the package is rotated. The inspection electrode applies the AC high voltage with the DC high voltage offset to the package. Current flow through the package is then detected by the detection electrode. A detection board then processes the current flow to determine if a leak is present in the package using the same equations as the preferred embodiment. If a leak is present, a signal is sent to a display for a user to visualize.

The AC high voltage with a DC high voltage offset is generated using either a pulse autotransformer or a pulse transformer, high voltage control board and a high-voltage rectifier.

The inspection electrode can be rigid, semi-rigid, or flexible in the form of a brush, a rod, steel, or similarly shaped object. Further, the inspection electrode can be made of metals, conductive polymers, or any other kind of conductive material. During application of the AC high voltage with a DC high voltage offset, the inspection electrode can be touching the package or a small air gap can exist between the package and the inspection electrode.

The detection electrode can be rigid, semi-rigid, or flexible in the form of a brush, a rod, steel, or similarly shaped object. Further, the detection electrode can be made of a metal, metal alloys, conductive polymers, or any other kind of conductive material. During detection of the current produced with the AC high voltage with a DC high voltage offset, the detection electrode can be touching the package or a small air gap can exist between the package and the detection electrode.

The package can be in the form of a vial, a syringe, an ampoule, a pouch, and any other kind of container made of plastic, glass, aluminum foils, or any other kind of material suitable to be filled with medicinal, food, or similar product.

A further embodiment of the method includes generating an AC high voltage with a DC high voltage offset in a circuit. A package is placed on a conveyor. The conveyor moves the package between an inspection electrode and a detection electrode, which are located within the circuit. The inspection electrode applies the AC high voltage with the DC high voltage offset to the package. Current flow through the package is then detected by the detection electrode. A detection board then processes the current flow to determine if a leak is present in the package using the same equations as the preferred embodiment. If a leak is present, a signal is sent to a display for a user to visualize.

The AC high voltage with a DC high voltage offset is generated using either a pulse autotransformer or a pulse transformer, a high-voltage rectifier and a DC voltage power supply.

The inspection electrode can be rigid, semi-rigid, or flexible in the form of a brush, a rod, steel, or similarly shaped object. Further, the inspection electrode can be made of metals, conductive polymers, or any other kind of conductive material. During application of the AC high voltage with a DC high voltage offset, the inspection electrode can be touching the package or a small air gap can exist between the package and the inspection electrode.

The detection electrode can be rigid, semi-rigid, or flexible in the form of a brush, a rod, steel, or similarly shaped object. Further, the detection electrode can be made of a metal, metal alloys, conductive polymers, or any other kind of conductive material. During detection of the current produced with the AC high voltage with a DC high voltage offset, the detection electrode can be touching the package or a small air gap can exist between the package and the detection electrode.

The package can be in the form of a vial, a syringe, an ampoule, a pouch, a bag, a blow-seal, and any other kind of container made of plastic, glass, aluminum foils, or any other kind of material suitable to be filled with medicinal, food, or similar perishable or sensitive product.

There are many embodiments of a device for applying the ADHV testing method. Such embodiments vary based on the types of packages to be tested and whether packages are to be tested one at a time, also known as off-line testing, or if multiple packages are to be tested continuously without user manipulation, also known as on-line testing.

Figure 5:
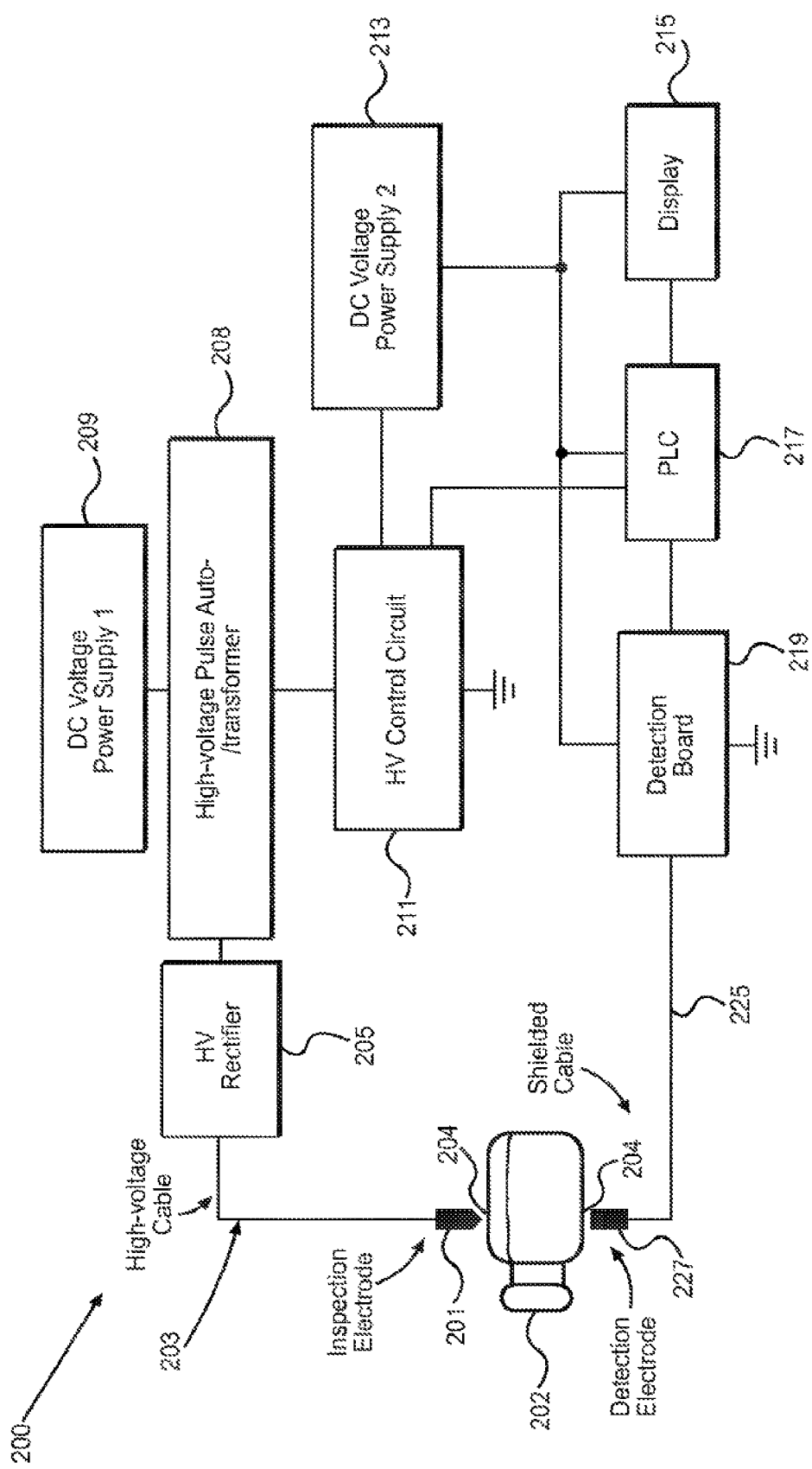
FIG. 5 shows a representation of a preferred embodiment of the ADHV leak detection system.

As shown in FIG. 5, a preferred embodiment of a leak detection circuit 200 includes an inspection electrode 201 connected to high voltage rectifier 205 by a high voltage cable 203, the high voltage rectifier further electrically connected to a pulse autotransformer 208, a first DC voltage power supply 209 electrically connected to the pulse autotransformer 208, the pulse autotransformer electrically connected to a high voltage control board 211, the high voltage control board 211 electrically connected to a programmable logic controller 217, a detection electrode 227 connected to a detection board 219 via a shielded cable 225, the detection board electrically connected to the programmable logic controller, a display 215 electrically connected to the programmable logic controller, a secondary DC power supply 213 electrically connected to the high voltage control board 211, the detection board 219, the programmable logic controller 217, and the display 215, wherein the detection electrode 227 and the inspection electrode 201 are positioned such that a package 202 fits between the detection electrode 227 and the inspection electrode 201 and AC high voltage with a DC high voltage offset is applied to the package once positioned between the inspection electrode 201 and detection electrode 227. The AC high-voltage with a DC high-voltage offset may be generated by a means known in the art other than the pulse autotransformer 208 with a DC voltage power supply 213, a high-voltage rectifier 205, and a high voltage control board 211, such as, but not limited to, a pulse transformer 208 with a DC voltage power supply 213, a high-voltage rectifier 205, and a high voltage control board 211. In such a case the inspection electrode 201 is electrically connected to the high-voltage rectifier 205, which is electrically connected to the pulse transformer 208.

Either the combination of the DC power supply 209, the high voltage control board 211, and the high voltage pulse autotransformer 208 or the combination of the DC power supply 209, the high voltage control board 211, and pulse transformer 208 generate AC high voltage.

The high voltage control board 211 can be, but is not limited to, combination of microprocessor and a MOSFET or IGBT. The microprocessor turns the MOSFET or IGBT on and off by generating pulses with certain duration and duty cycle which switches the current flow from the DC power supply 209 through the high voltage pulse autotransformer 208 or the high voltage pulse transformer 208 on and off. Since the current through the high voltage pulse autotransformer 208 or the high voltage pulse transformer 208 switched on and off AC high voltage is generated at outputs of the high voltage pulse autotransformer 208 or the high voltage pulse transformer 208. The high voltage control board 211 adjusts the amplitude of the generated AC high voltage by changing the duration and the duty cycle of the pulses.

The high voltage rectifier 205 rectifies the AC high voltage and provides a DC offset to the AC high voltage. The AC high voltage with DC offset is applied to the package through the high voltage cable 203 and inspection electrode 201.

Once AC high voltage with DC high voltage offset is applied to the package 202 via the inspection electrode 201, the detection electrode 227 receives the resulting current through the package 202. The current then travels to a current detection board 219, where the current is processed to determine whether or not a leak is present.

The detection board 219 is electrically connected in to the programmable logic controller 217. The detection board 219 processes the received signal and sends the processed signal to the programmable logic controller 217 and the display shows whether a leak is present. The programmable logic controller 217 is electrically connected to the current detection board 219, such that the programmable logic controller 217 can be programed to interact with the detection board 219 in the desired manner. The programmable logic controller 217 is further electrically connected to the high voltage control board 211 such that the programmable logic controller 217 can be programed to interact with the high voltage control board 211 in the desired manner. The display 215 is electrically connected to the programmable logic controller 217 to provide information stored in the programmable logic controller to a user, including audio and visual information. The second DC voltage power supply is connected to the high voltage control board 211, the detection board 219, programmable logic controller 217, and display 215 to supply them by electrical power.

The AC high-voltage with a DC high-voltage offset may generated by a means known in the art other than the pulse autotransformer 207 with the DC voltage power supply 209, the high voltage control board 211, and the high-voltage rectifier 205, such as, but not limited to, a pulse transformer 208 with the DC voltage power supply 209, the high voltage control board 211, and the high-voltage rectifier 205. In such a case the inspection electrode 201 is electrically connected to the high-voltage rectifier 205, which is electrically connected to the pulse autotransformer 207 or the pulse transformer 208.

The package 202 may be a vial, a syringe, an ampoule, or other similar pouch, bottle, container, or sealed holder. Further, the package 202 can be made of plastic, glass, or another material which exhibits capacitive and resistive properties. The package is filled with product typically, but not exclusively, including food, medicinal, biological, or other similar products. A holder may be used to secure the package 202 during testing. The holder may include, but is not limited to, a tray, a rod with securing mechanism, a belt, or other similar device. Additionally, the holder may be attached to a rotation mechanism that rotates the holder and the package between the inspection and detection electrodes.

Both the inspection electrode 201 and detection electrode 227 can be shaped differently and made of different materials depending on their application. The inspection electrode 201 and detection electrode 227 can be made of a metal, metal alloys, conductive polymers, magnetic materials, or any other kind of conductive material. The inspection electrode 201 and detection electrode 227 can be rigid, semi-rigid, or flexible, and in the form of a brush, a rod, a comb, or a similarly shaped object. During application and detection of the current produced with the AC high voltage with a DC high voltage offset, both the inspection electrode 201 and detection electrode 227 can be touching the package 202. Conversely, a small air gap 204 can exist between the package 202 and the inspection electrode 201 and detection electrode 227. The small air gap 204 can be between the inspection electrode 201 and the package, and the detection electrode 227 and the package 202. The small air gap 204 can be between 0.2 mm to 5 mm wide. The inspection electrode 201 and detection electrode 227 should not touch each other during testing, and they should be positioned far enough apart to prevent arcing.

The inspection electrode 201 and detection electrode 227 may also be movable in relation to the package. A sliding mechanism can be attached to either or both of the inspection electrode and detection electrode. The sliding mechanism can move along the length of the package and towards or away from the package. This movement allows the electrodes to be moved apart during placement and removal of the package from between the inspection electrode and the detection electrode. The movement afforded by the sliding mechanism also allows the inspection electrode and detection electrode to maintain contact with, or an even distance from, a package with slopes, curves or irregular shapes during testing.

Figure 11:
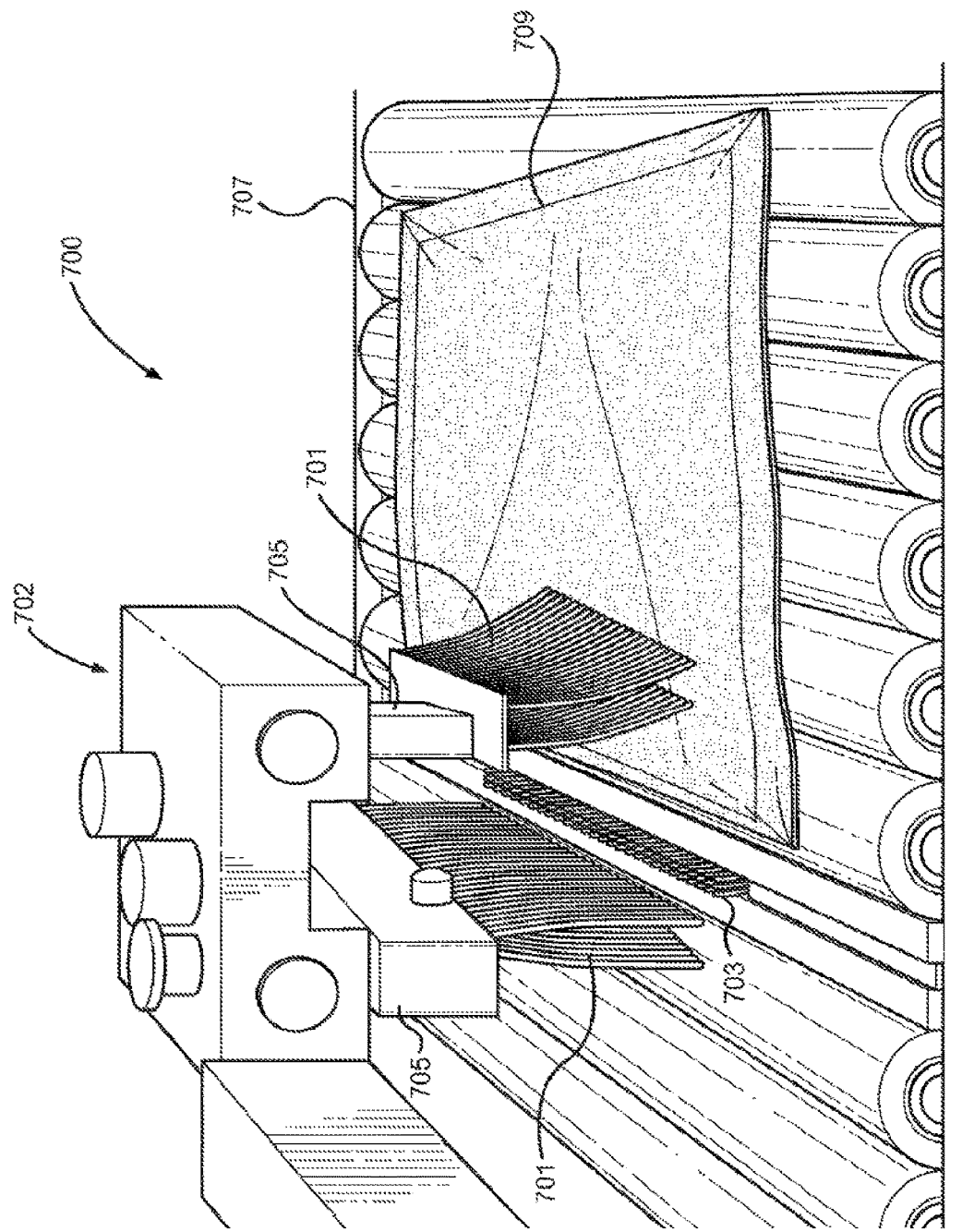
FIG. 11 shows an embodiment of an on-line ADHV leak detection system.

A conveyor may also be used in conjunction with leak detection circuit 200 for on-line testing. One or more packages are placed on the conveyor, which moves the package between the inspection electrode 201 and the detection electrode 227. Depending on the type of package to be tested, the inspection electrode 201 and detection electrode 227 may be configured to touch the package 202 during testing or be spaced to provide an air gap between the electrodes 201 and 227 and the package 202. The conveyor can be structured in any way which would permit the inspection electrode 201 be positioned in such a way to apply an AC high voltage with DC high voltage offset to one surface of the package 202 and permit the detection electrode 227 to be positioned to receive the resulting current at an opposing surface of the package 202. FIG. 11 provides an example of one possible embodiment of the leak detection circuit 200 coupled with a conveyor. The conveyor in FIG. 11 is a series of rollers where a detection electrode is positioned between two rollers and an inspection electrode hangs above the conveyor. Another viable organization would be a conveyer system with two belts. The electrodes 201 and 227 are placed between the two conveyer belts at a certain distance from each other to prevent a direct spark between the electrodes. Use of a conveyor with the leak detection system 200 does not otherwise limit the structural variety of the elements of the preferred embodiment discussed.

Figure 7:
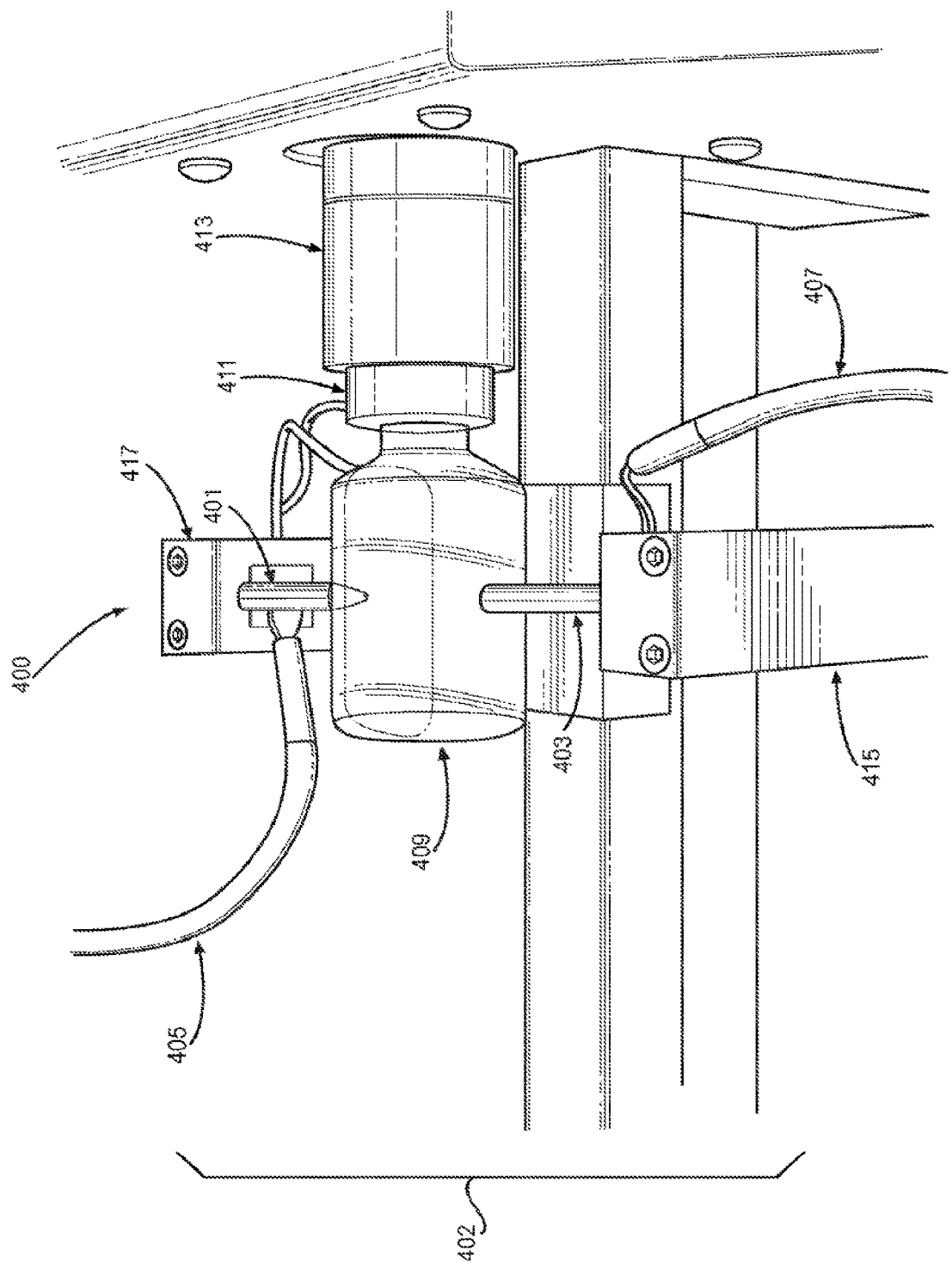
FIG. 7 shows an embodiment of an off-line ADHV leak detection system configured to test a vial.

FIG. 7 shows another embodiment of a leak detection system 400, specifically at a testing interface 402 where a package 409 is secured between an inspection electrode 401 and a detection electrode 403. A holder 411 secures the package 409, shown in this embodiment as a vial, horizontally during testing. A rotation mechanism 413 spins the holder 411 and the package 409 coaxially during testing. The inspection electrode 401 and the detection electrode 403 do not touch the package 409 in this embodiment to prevent scratching or marking of the package 409 during testing.

An inspection sliding mechanism 417 is attached to the inspection electrode 401. The inspection sliding mechanism 417 allows the inspection electrode 401 to move horizontally back and forth along the length of the package 409 during testing. A detection sliding mechanism 415 is attached to the detection electrode 403. The detection sliding mechanism 415 allows the detection electrode 403 to move horizontally back and forth along the length of the package 409 during testing.

Figure 8:
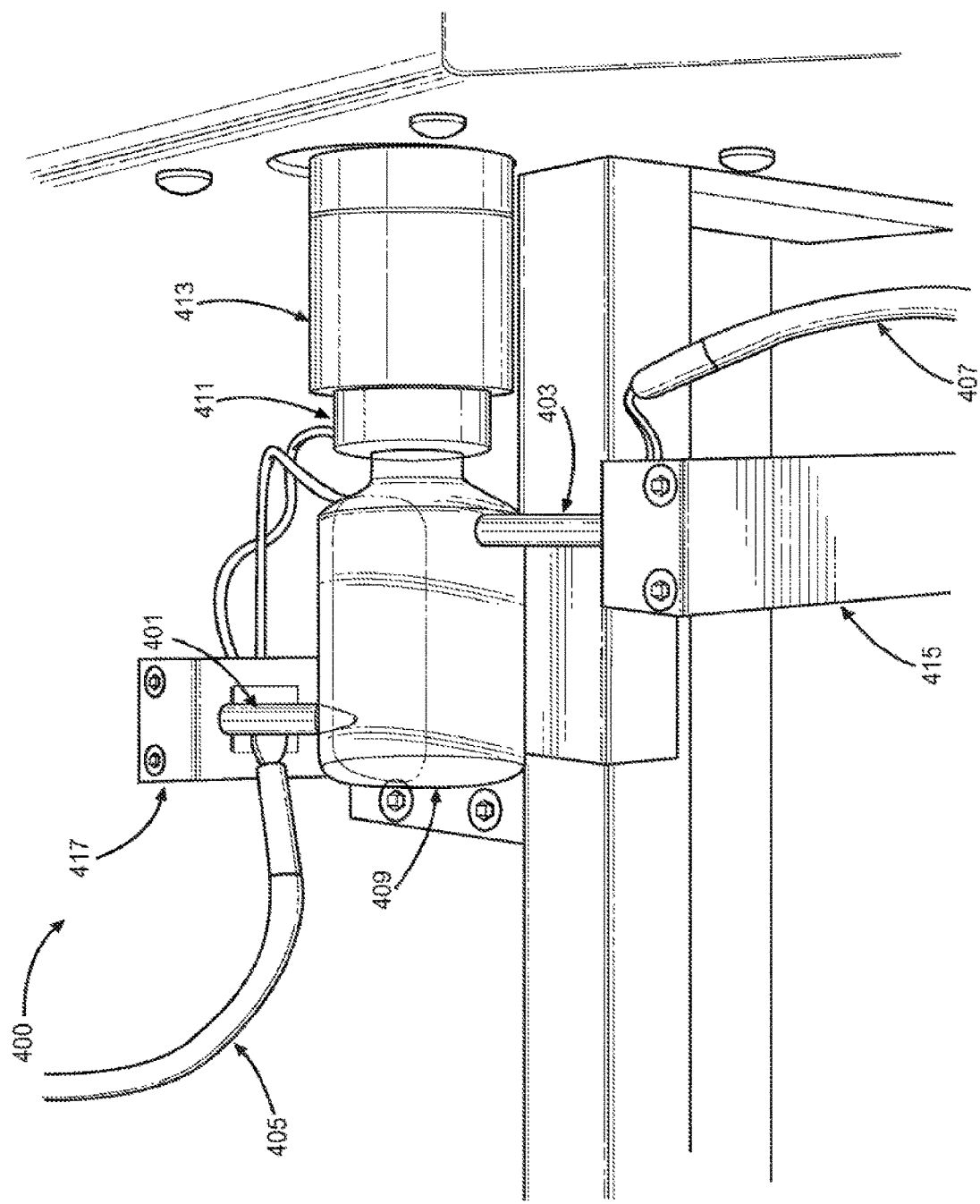
FIG. 8 shows the embodiment of an off-line ADHV leak detection system of FIG. 7, and highlights movement of inspection and detection electrodes along a package.

FIG. 8 shows the same embodiment of the leak detection system 400. However, FIG. 8 demonstrates the positioning of the inspection electrode 401 and the detection electrode 403 achievable when attached to the inspection sliding mechanism 417 and detection sliding mechanism 415, respectively. Where FIG. 7 shows the inspection electrode 401 and detection electrode 403 centered, FIG. 8 shows the electrodes 401 and 403 offset as a representation of sliding mechanisms 415 and 417 ability to slide the electrodes 401 and 403 back and forth along the length of the package 409 during testing.

A high voltage cable 405 connects the inspection electrode 401 of the embodiment shown in FIG. 7 to the remaining elements of the leak detection circuit 200 as described in the preferred embodiment and shown in FIG. 5. Likewise, the shielded cable 407 connects the detection electrode 403 to the remaining elements of the leak detection circuit 200 as described in the preferred embodiment and shown in FIG. 5.

Figure 9:
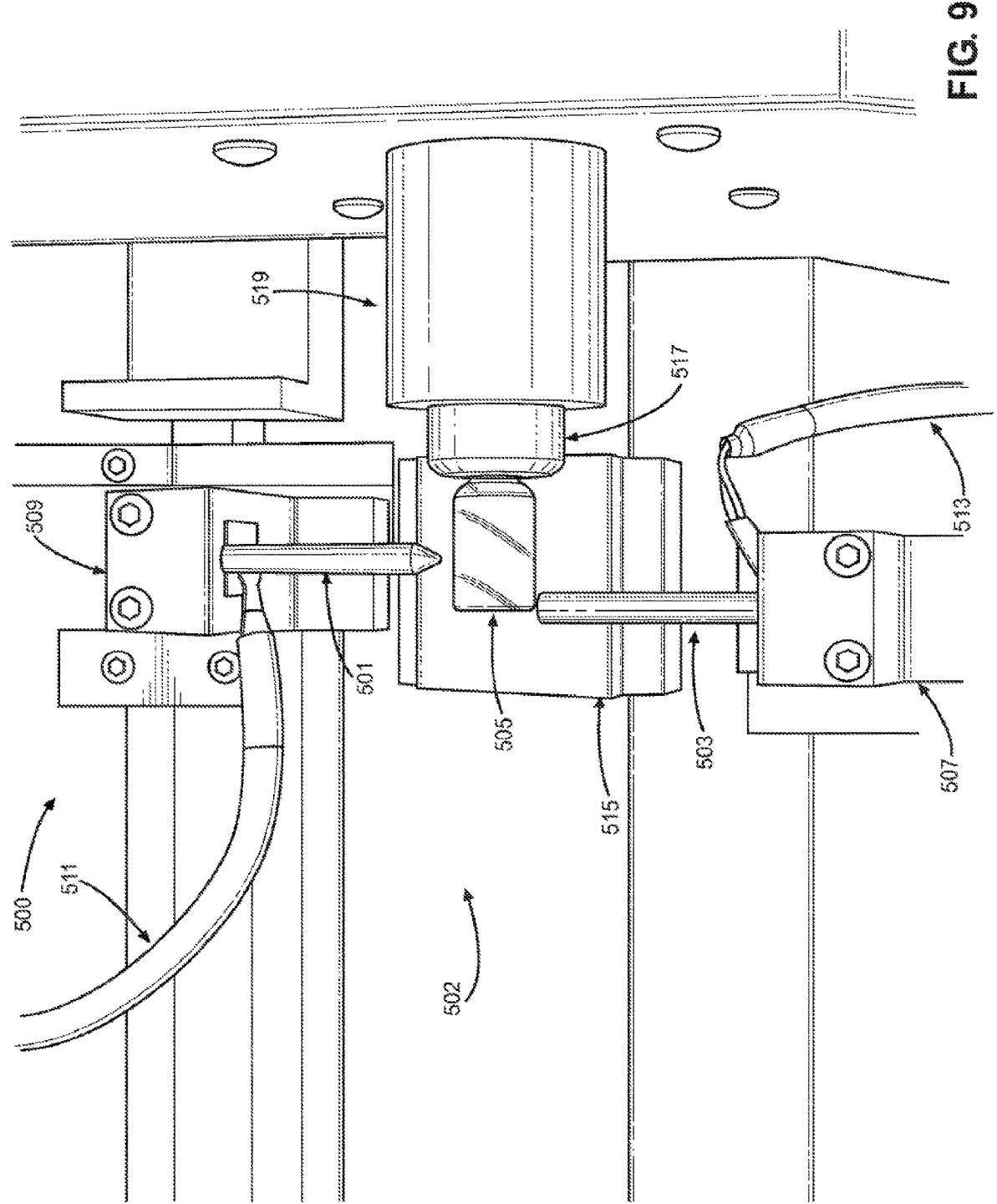
FIG. 9 shows an embodiment of an off-line ADVH leak detection system configured to test a different type of vial.

FIG. 9 shows another embodiment of a leak detection system 500, specifically at a testing interface 502 where a package 505 is secured between an inspection electrode 501 and a detection electrode 503. A holder 517 secures the package 505, shown in this embodiment as a vial, horizontally during testing. A rotation mechanism 519 spins the holder 517 and the package 505 coaxially during testing. A tray 515 is positioned below the package 505. The inspection electrode 501 and the detection electrode 503 again do not touch the package 505 in this embodiment to prevent scratching or marking of the package 505 during testing.

An inspection sliding mechanism 509 is attached to the inspection electrode 501. The inspection sliding mechanism 509 allows the inspection electrode 501 to move horizontally back and forth along the length of the package 505 during testing. A detection sliding mechanism 507 is attached to the detection electrode 503. The detection sliding mechanism 507 allows the detection electrode 503 to move horizontally back and forth along the length of the package 505 during testing. The electrodes 501 and 503 are offset in FIG. 9 as a representation of the ability of the sliding mechanisms 507 and 509 to slide the electrodes 501 and 503 back and forth along the length of the package 505 during testing. The remaining elements, their variations, and structural cooperation are as described in the preferred embodiment.

A high voltage cable 511 connects the inspection electrode 501 of the embodiment shown in FIG. 9 to the remaining elements of the leak detection circuit 200 as described in the preferred embodiment and shown in FIG. 5. Likewise, the shielded cable 513 connects the detection electrode 503 to the remaining elements of the leak detection circuit 200 as described in the preferred embodiment and shown in FIG. 5. The remaining elements, their variations, and structural cooperation are as described in the preferred embodiment.

Figure 10:
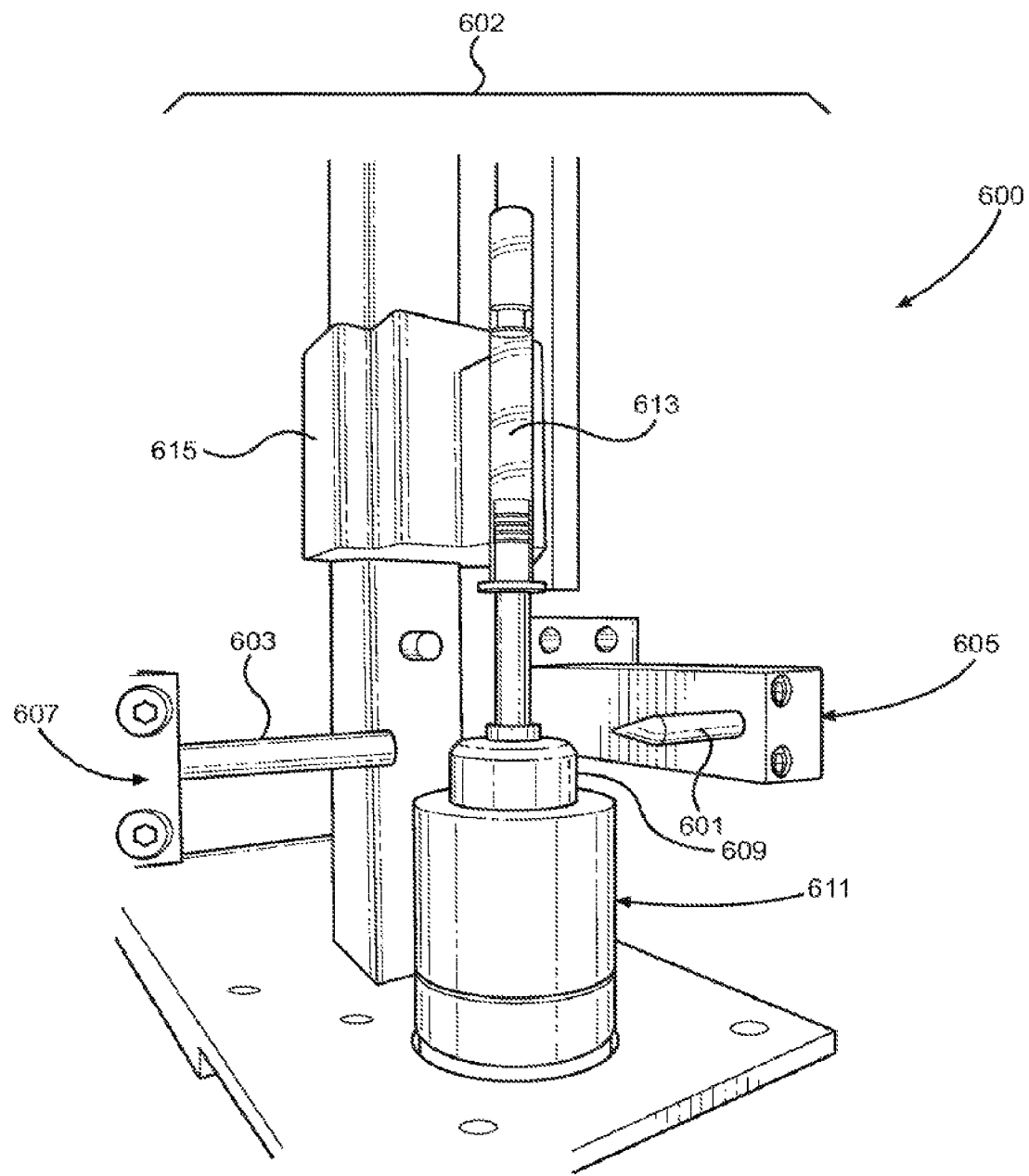
FIG. 10 shows an embodiment of an off-line ADHV leak detection system configured to test a different type of package, namely a syringe.

FIG. 10 shows yet another embodiment of a leak detection system 600, specifically at a testing interface 602 where a package 613 is secured between an inspection electrode 601 and a detection electrode 603. A holder 609 secures the package 613, shown in this embodiment as syringe, horizontally during testing. A rotation mechanism 611 spins the holder 609 and the package 613 coaxially during testing. A tray 615 is positioned below the package 613. The inspection electrode 601 and the detection electrode 603 again do not touch the package 613 in this embodiment to prevent scratching or marking of the package 613 during testing.

An inspection sliding mechanism 605 is attached to the inspection electrode 601. The inspection sliding mechanism 605 allows the inspection electrode 601 to move horizontally back and forth along the length of the package 613 during testing. A detection sliding mechanism 607 is attached to the detection electrode 603. The detection sliding mechanism 607 allows the detection electrode 603 to move horizontally back and forth along the length of the package 613 during testing. The electrodes 601 and 603 are at similar relative positions in FIG. 10, but are capable of sliding along the length of the package 613 independently as described in previous embodiments.

The inspection electrode 601 of the embodiment shown in FIG. 10 is connected to the remaining elements associated with the leak detection circuit 200 as described in the preferred embodiment and shown in FIG. 5. Likewise, the detection electrode 603 is connected to the remaining elements associated with the leak detection circuit 200 as described in the preferred embodiment and shown in FIG. 5. The remaining elements, their variations, and structural cooperation are as described in the preferred embodiment.

FIG. 11 shows a conveyor embodiment of a leak detection system 700, specifically at a testing interface 702 where a package 709 delivered between one or more inspection electrodes 701 and a detection electrode 703 via a conveyor 707. The conveyor 707 provides the same function as the holder in previous embodiments of securing the package 709, shown in this embodiment as a non-rigid IV bag, between the inspection electrode 701 and the detection electrode 703. As with the preferred embodiment, the conveyor embodiment show in FIG. 11 could be used to test packages of other shapes, size, materials, and designs, including but not limited to vials, ampoules, syringes, pouches, and similar containers. Further, as with the preferred embodiment, the inspection electrode 701 and detection electrode 703 need not be limited to only brushes and may include the variations provided in the preferred embodiment.

In this embodiment, the inspection electrode 701 and the detection electrode 703 are brushes, instead of rods, as shown in previous embodiments. The inspection electrode 701 and the detection electrode 703 contact the package 709 at opposing surfaces of the package 709 as the conveyor 707 passes the package 709 between the two electrodes 701 and 703. The electrodes 701 and 703 are spaced far enough apart from each other as to prevent arcing during testing.

An electrode sliding mechanism 705 is attached to the inspection electrode 701. The electrode sliding mechanism 705 allows the inspection electrode 701 to move back and forth along the width of the conveyor 707 during testing. While not shown in FIG. 11, a similar electrode sliding mechanism can be attached to the detection electrode 703 to allow the detection electrode to slide back and forth along the width of the conveyor 707 during testing.

The inspection electrode 701 of the embodiment shown in FIG. 11 is connected to the remaining elements associated with the leak detection circuit 200 as described in the preferred embodiment and shown in FIG. 5. Likewise, the detection electrode 703 is connected to the remaining elements associated with the leak detection circuit 200 as described in the preferred embodiment and shown in FIG. 5. The remaining elements, their variations, and structural cooperation are as described in the preferred embodiment.

Figure 20:
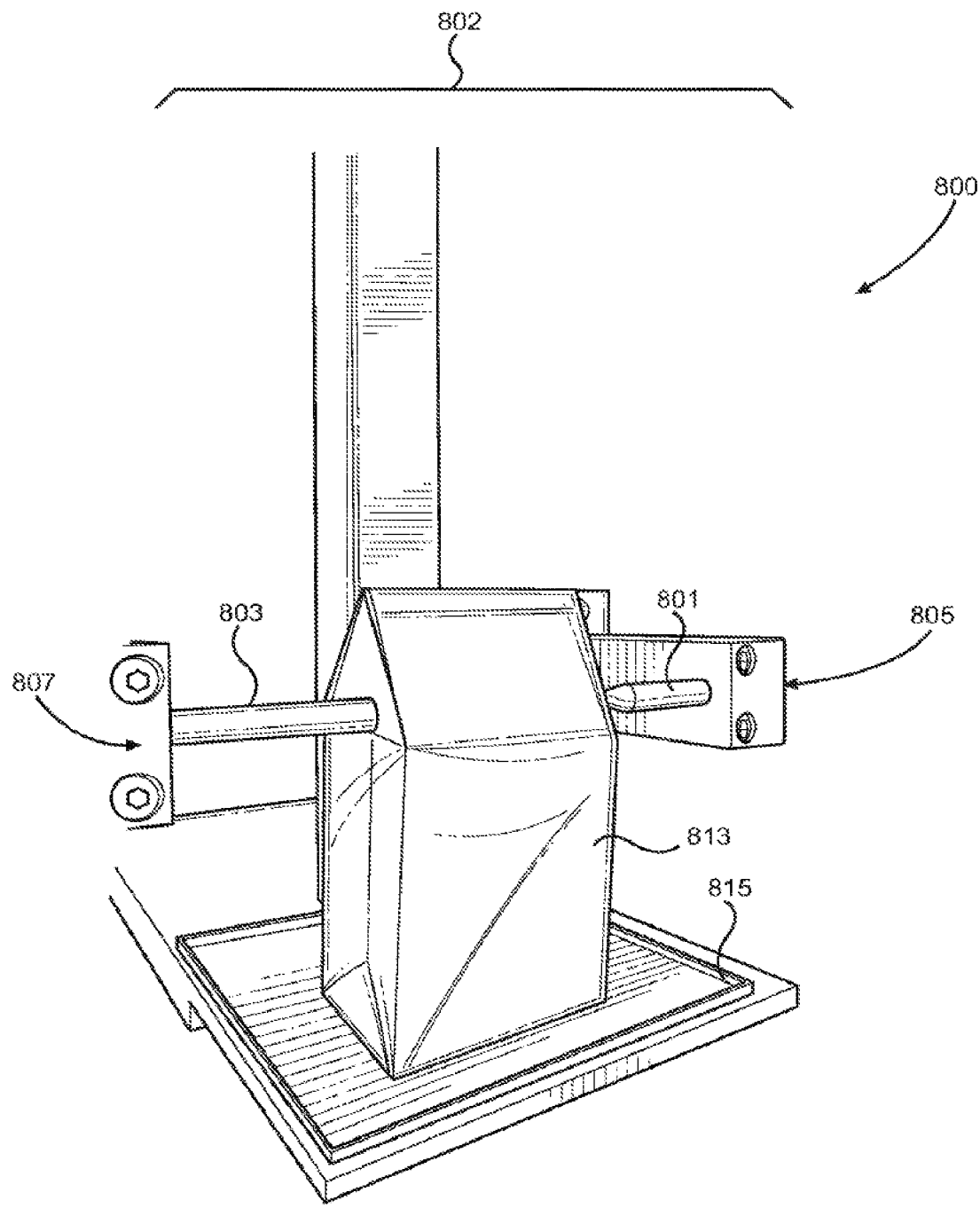
FIG. 20 shows an embodiment of an off-line ADVH leak detection system configured to test a different type of package, namely a triple-point seal gusset package.

FIG. 20 shows yet another embodiment of a leak detection system 800, specifically at a testing interface 802 where a package 813 is secured between an inspection electrode 801 and a detection electrode 803. A tray 815 is positioned below the package 813 to secure the package during testing. The inspection electrode 801 and the detection electrode 803 again do not touch the package 813 in this embodiment to prevent scratching or marking of the package 813 during testing.

An inspection sliding mechanism 805 is attached to the inspection electrode 801. The inspection sliding mechanism 805 allows the inspection electrode 801 to move horizontally back and forth along the length of the package 813 during testing. A detection sliding mechanism 807 is attached to the detection electrode 803. The detection sliding mechanism 807 allows the detection electrode 803 to move horizontally back and forth along the length of the package 813 during testing. The electrodes 801 and 803 are at similar relative positions in FIG. 20, but are capable of sliding along the length of the package 813 independently as described in previous embodiments.

In this embodiment 800, the package 813 primary tested is a gusset pouch, or a package that has a triple seal point. The inspection electrode 805 is placed under the gusset of the pouch and its point touches the triple seal point of the package from the gusset side.

The inspection electrode 801 of the embodiment shown in FIG. 20 is connected to the remaining elements associated with the leak detection circuit 200 as described in the preferred embodiment and shown in FIG. 5. Likewise, the detection electrode 803 is connected to the remaining elements associated with the leak detection circuit 200 as described in the preferred embodiment and shown in FIG. 5. The remaining elements, their variations, and structural cooperation are as described in the preferred embodiment. The package is filled with medicinal, food, or other product is placed in a tray 815 so that it sits upright.

EXAMPLES

Example 1

Conventional HVLD Exposure

In any HVLD technology it is necessary to reach the highest possible voltage to produce a high signal response from a defect, without sparking around the container to break down the insulation of the container and the liquid product inside the container, while still aiming to make the container conductive to get better sensitivity of the leak detection.

In the case where a conventional HVLD technology is used for leak detection, the applied pure AC high-voltage is able to penetrate through the capacitive impedance of a good container without high attenuation and expose the product within the container to the AC high-voltage directly. This results in potentially harmful and unwanted exposure of the product inside of a good container to high voltage with potentially negative side effects.

Figure 14:
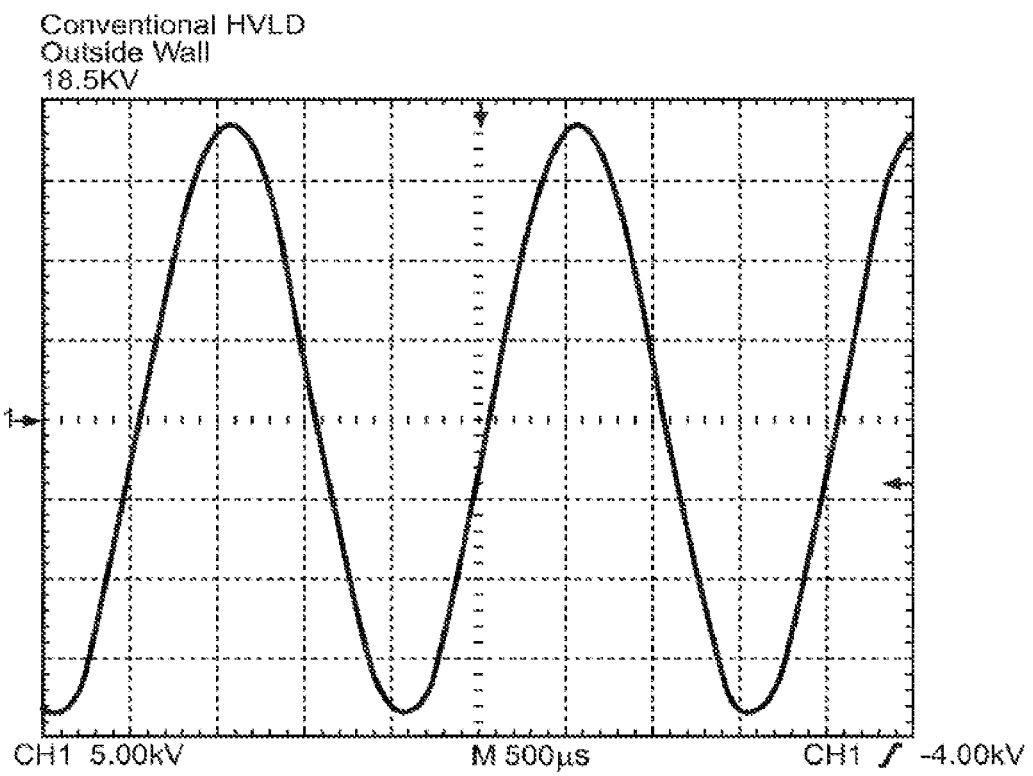
FIG. 14 is a graph of data collected during exposure testing of conventional HVLD leak detection at the outside wall of a package.
Figure 15:
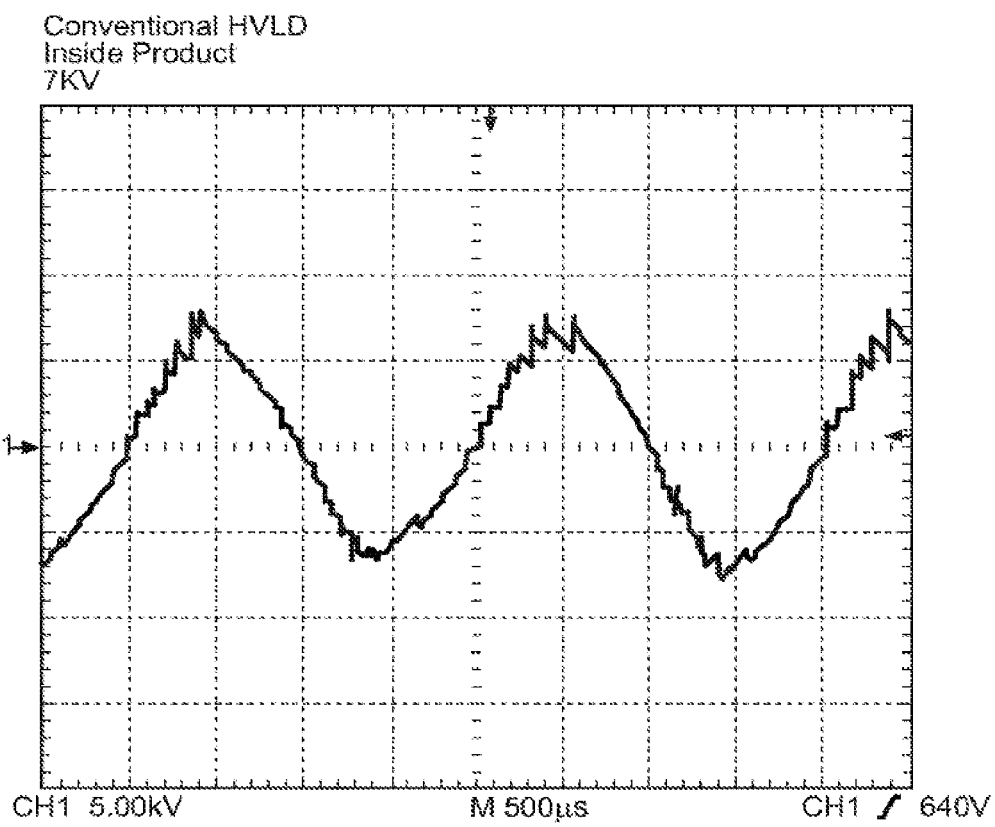
FIG. 15 is a graph of data collected during exposure testing of conventional HVLD at an internal liquid product.

To determine how much voltage that the product inside a container is exposed to during a conventional HVLD inspection, a 15 mL vial was put under 18.5 $kV_{Pk}$ AC high-voltage and the voltage inside the container was measured. The vial was without defect and filled with tap water. A Tektronix P6015A high-voltage probe with 1:1000 ratio and a Tektronix TDS2024 oscilloscope were used for this measurement. Conductivity of the tap water was 87.5 uS. A voltage measurement probe was located on the inside wall of the vial close to a pointed inspection electrode. FIG. 15 shows the measured voltage of the water inside the vial during an inspection by the conventional HVLD system. FIG. 14 shows the measured voltage applied at the outside wall of the vial during testing by the conventional HVLD, which was 18.5 $kV_{Pk}$. Tektronix P6015A high-voltage probe with 1:1000 ratio and Tektronix TDS2024 oscilloscope was used for this measurement.

The measured voltage of the tap water inside the vial was around 7 $kV_{Pk}$, shown in FIG. 15. This experiment result shows that the sensitive medicinal products inside the vials were directly exposed to extremely high voltage when inspected by the conventional HVLD system. The effect of this high voltage on product within the vial varies depending on heat sensitivity or other factors.

Example 2

ADHV Exposure

One of the main advantages of ADHV testing over the conventional HVLD technology is that the product inside the containers is not exposed to high voltage directly. The syringes, vials, and other containers are made of glass or plastic. Glass and plastic are electrical insulators that are capacitive in nature and therefore inherently fully block, or attenuate, the DC high voltage stronger than an AC high voltage of the same amplitude. The product inside containers are either completely insulated from the DC high voltage offset or are only exposed to a relatively low DC voltage. The product is only exposed to the DC high voltage in presence of a leak or leaks in the container.

To prove that the product inside the containers are not exposed to high-voltage during an inspection by ADHV, the same sample used in Example 1 with conventional HVLD system, a 15 mL vial filled with tap water, was tested. Conductivity of the tap water was 87.5 uS. The peak amplitude of voltage applied in the ADHV system was −18.5 $kV_{Pk}$.

The experimental vial was without defect. Tektronix P6015A high-voltage probe with 1:1000 ratio and Tektronix TDS2024 oscilloscope was used for this measurement.

Figure 18:
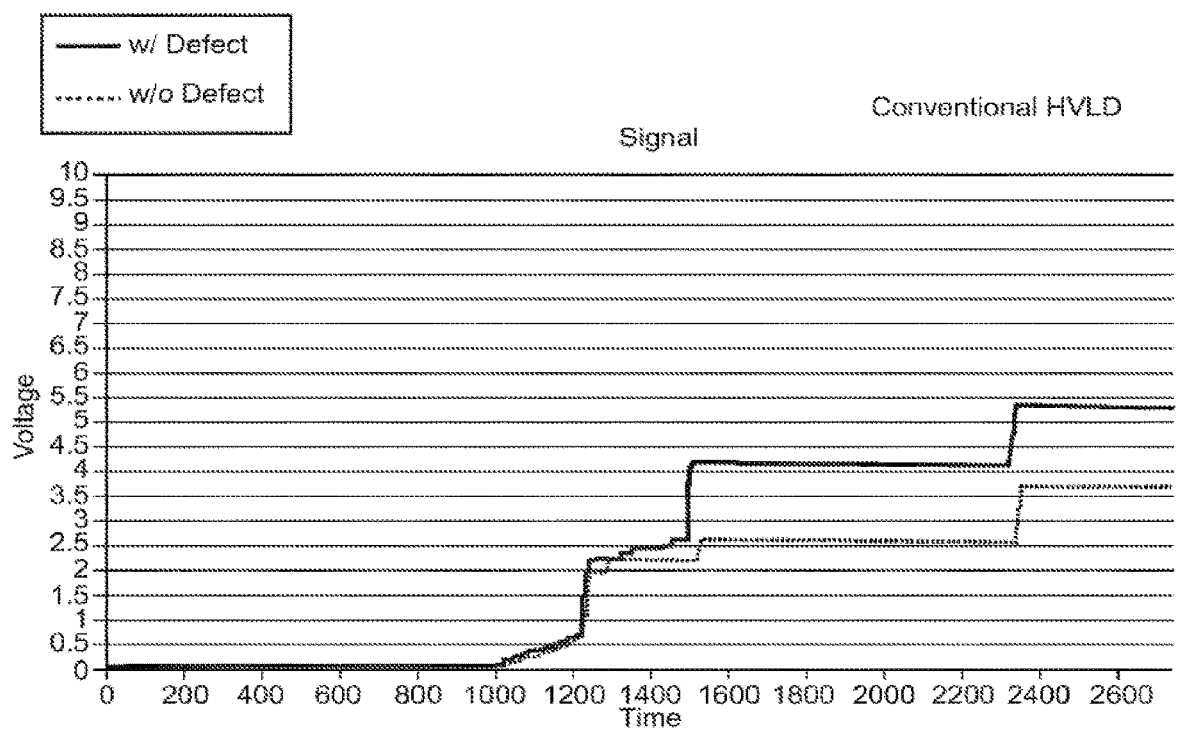
FIG. 18 is a graph of data collected during sensitivity testing of conventional HVLD, showing both the voltage over time of a defective and non-defective package.

The measured ADHV voltage when the ADHV was applied to the outside wall of the vial is shown in FIG. 18. It can be seen from this figure that amplitude of the AC component is around 5 $kV_{pp}$ and the DC high voltage offset is around −16 kV. Tektronix P6015A high-voltage probe with 1:1000 ratio and Tektronix TDS2024 oscilloscope was used for this measurement.

Figure 16:
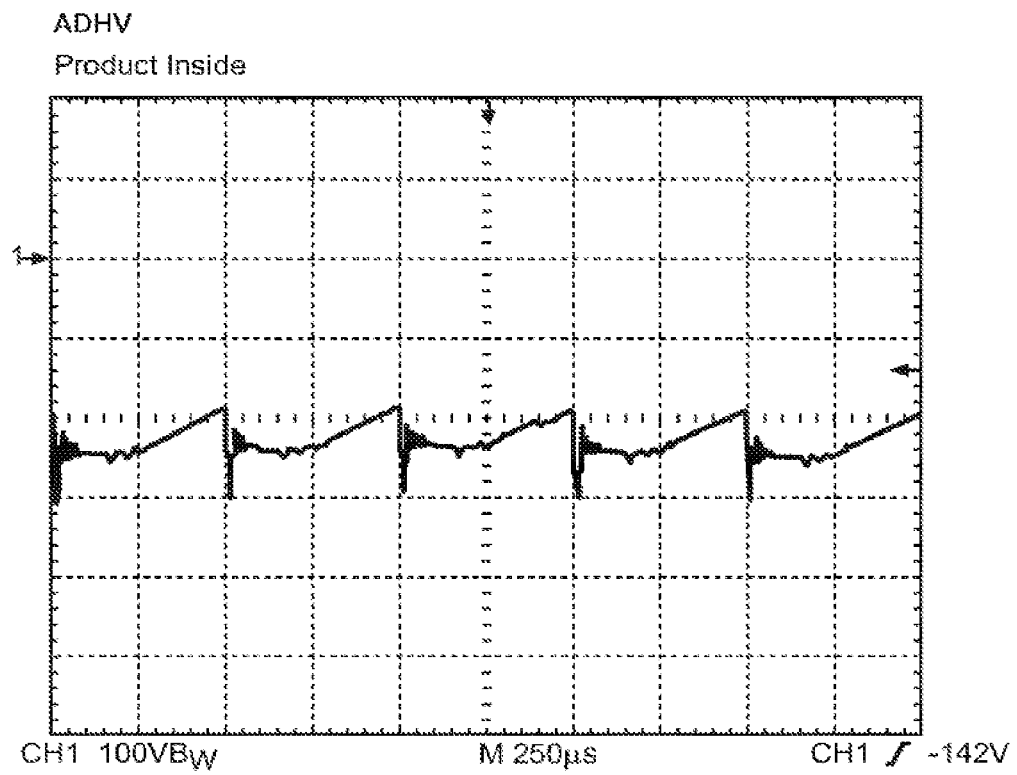
FIG. 16 is a graph of data collected during exposure testing of ADHV leak detection at an internal liquid product.
Figure 17:
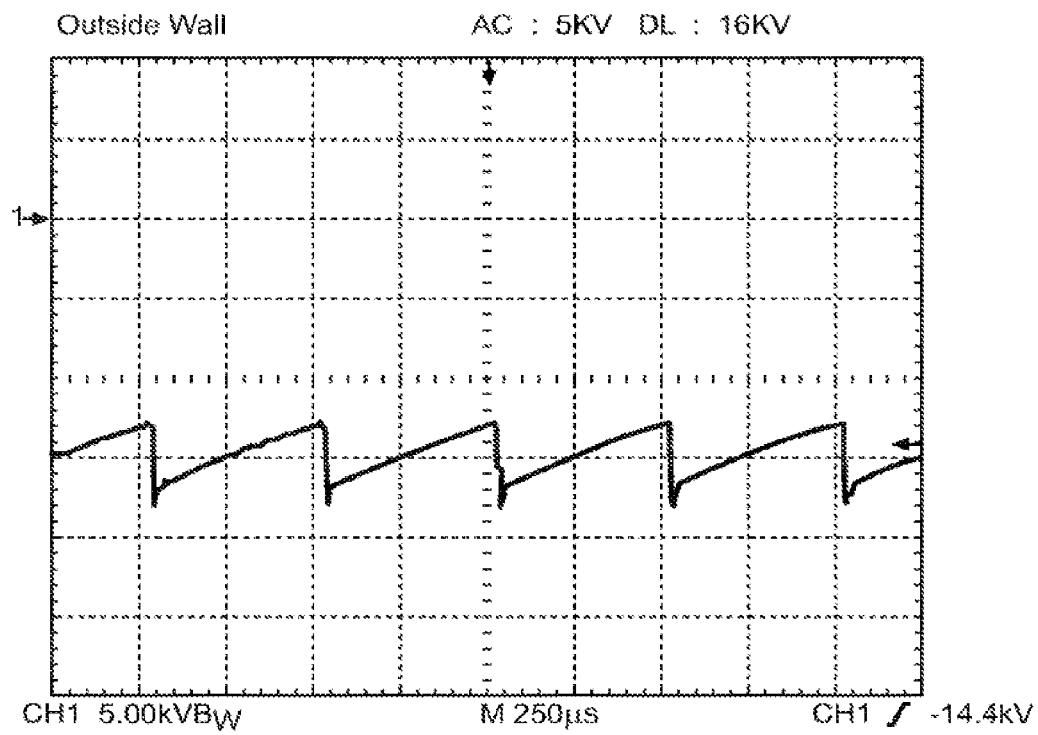
FIG. 17 is a graph of data collected during exposure testing of ADHV leak detection at the outside wall of a package.

As shown in FIG. 16, measured voltage of the product inside the vial during an inspection by HVLD technology based on ADHV was approximately −300$V_{Pk}$. The voltage measurement probe was located on the inside wall of the vial close to the inspection electrode. Tektronix P6015A voltage probe with 1:1000 ratio and Tektronix TDS2024 Oscilloscope was used for this measurement.

The test results show that the product, in this case tap water, is not exposed to high-voltage during an inspection by the ADHV technology when no defect is present. The high DC voltage was strongly attenuated by the capacitive impedance of the container. In comparison to this result, the measured voltage inside the vial in conventional HVLD system was 7 $kV_{Pk}$. In summary, HVLD technology based on an ADHV is the only HVLD method used in the pharmaceutical and biotechnology industry that can be truly nondestructive.

Example 3

Ozone Production

Another important advantage of the HVLD technology based on an ADHV is that it produces much less ozone than the conventional HVLD technologies. The amount of ozone produced by the ADHV method is negligible in comparison to the amount of ozone produced by the conventional HVLD method. An experiment was performed to determine how much ozone the conventional HVLD systems produce during an inspection in comparison to the HVLD technology based on an ADHV. A calibrated Aeroqual 200 Series ozone detector with 0.00 1ppm resolution was placed inside the test chamber of both systems. Both systems were hermetically sealed.

The AC high-voltage amplitude in the conventional HVLD system was set at 18.5 k $V_{Pk}$. The AC high-voltage was turned on for five minutes. The ozone detector detected 0.150 ppm ozone inside the chamber at the end of the test. The high-voltage amplitude at the ADHV system was set at −18.5 k $V_{Pk}$ and was turned on for five minutes. Ozone inside the chamber was 0.004 ppm at the end of the test.

This experiment shows that the ADHV system is a much safer inspection tool in terms of ozone production during operation compared with the conventional HVLD systems. This is especially important when HVLD systems are run on-line continuously on a conveyor belt, as the HLVD is consistently producing ozone around workers in such a setting.

Example 4

Sensitivity

Figure 12:
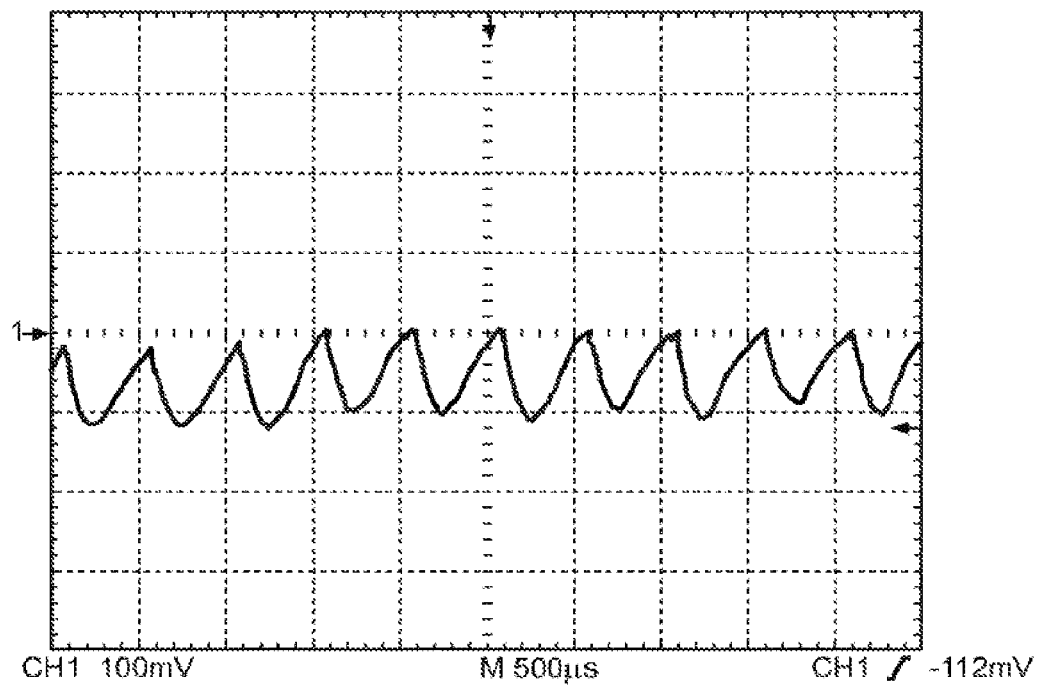
FIG. 12 is a graphical measurement of an AC high voltage with a DC voltage offset through a container received at the detection electrode.
Figure 13:
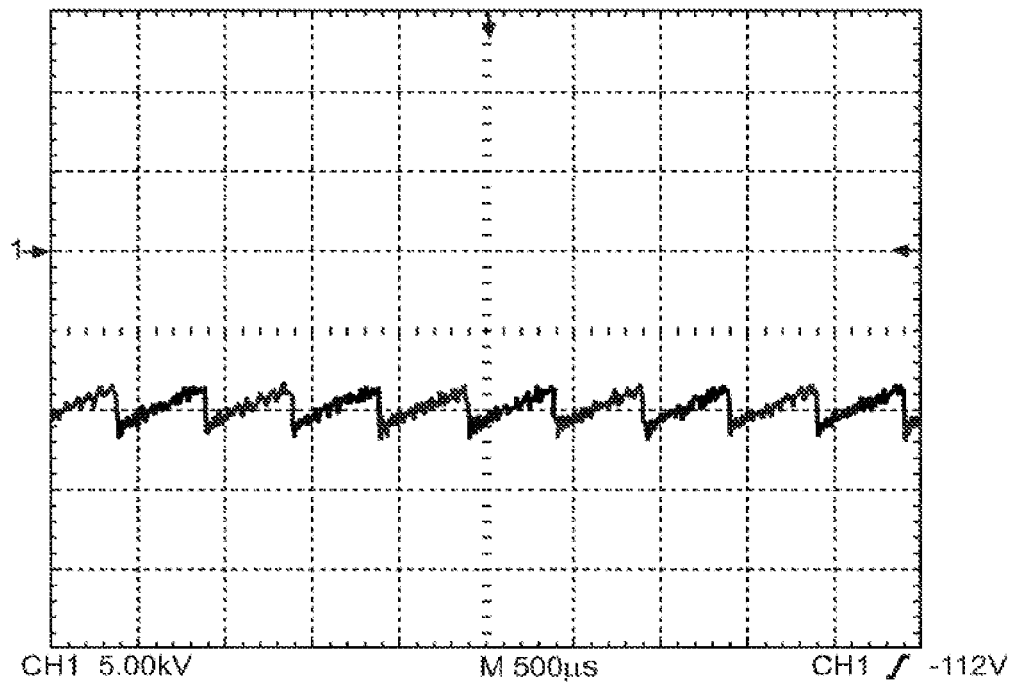
FIG. 13 is a graphical measurement of an AC high voltage with an offset DC high voltage when applied to a package.

ADHV has higher sensitivity than the conventional HVLD systems for detection of leaks in containers filled with low-conductivity aqueous products. FIG. 12 shows a graphical representation of ADHV voltage detected at the detection electrode during an inspection of a syringe without defect filled with tap water. The conductivity of the water was 87.5 uS. FIG. 13 shows a graphical representation of ADHV current applied to a container.

An experiment was performed by using identical samples to determine and compare the sensitivities of the two systems. A 1 mL syringe with defect and a 1 mL syringe without defect were tested. The defective syringe had a 2-micron laser-drilled pinhole which was made and certified by Lenox Laser.

For the testing of the conventional HVLD system, the high voltage was set at 12 $kV_{Pk}$. The results of the conventional HVLD system are shown in FIG. 18. The solid line shows the signal for the defective syringe, and the broken line shows the signal for the syringe without defect. The voltage set was 12 $kV_{Pk}$. The syringes were rotated at 320 rpm. The detected signal was around 3.6V for the syringe without defect and 5.4V for the defective syringe. The ratio of the signal levels for syringes with and without defect was 5.4V/3.6V=1.5.

Figure 19:
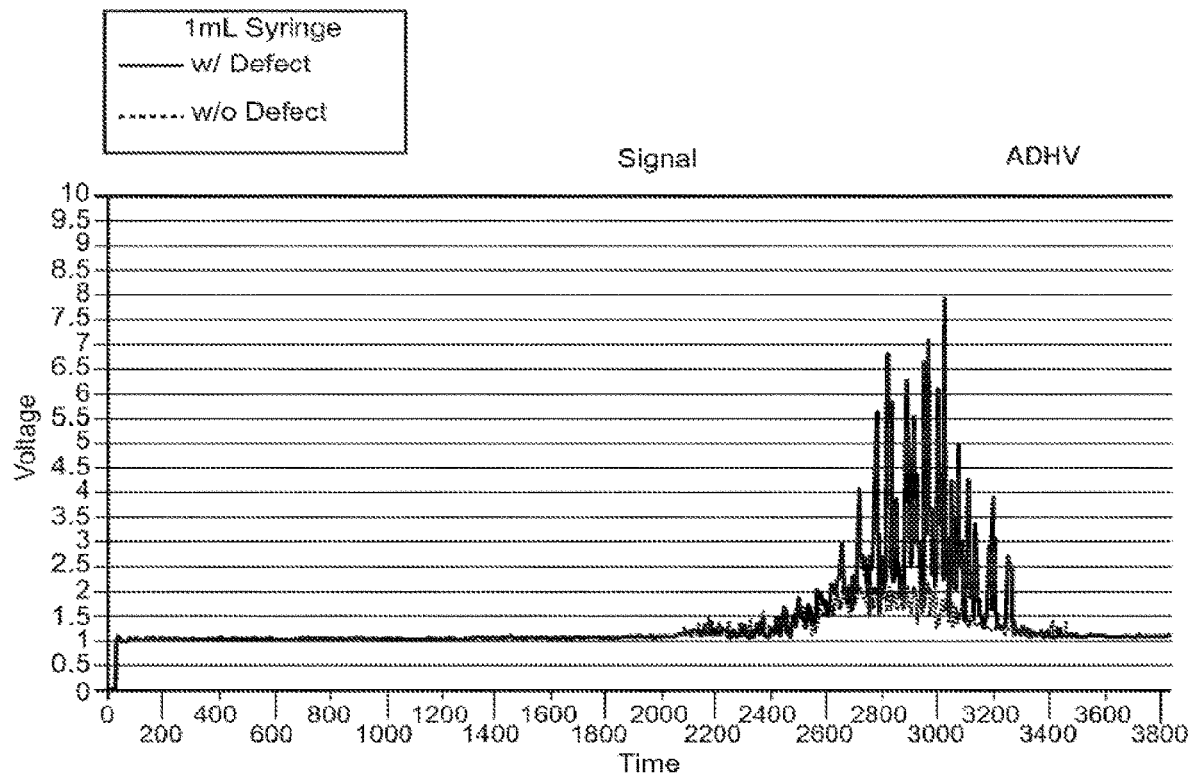
FIG. 19 is a graph of data collected during sensitivity testing of ADHV leak detection testing, showing both the voltage over time of a defective and non-defective package.

For the testing of the ADHV system, voltage was set at −12 $kV_{Pk}$. 1 mL syringes with and without defect were tested by the ADHV system. As shown in FIG. 19, the solid line represents the syringe with defect. The broken line shows the signal for the syringe without defect. Unlike the conventional HVLD system, the solid line of the ADHV system also notifies the location of the leak, which is the position of maximum amplitude of the signal. The high voltage was set at −12 $kV_{Pk}$. Both syringes tested were rotated at 320 rpm. The detected signal for the syringe without defect was 2.2V and 7.7V for the defective syringe. The ratio of the signal levels for the defective syringe to the syringe without defect was 7.7V/2.2V=3.5. This experiment shows that the ADHV technology is more than twice as sensitive as the conventional HVLD technology, and precisely locates the leak and or leaks, which is not the case with a conventional HVLD technology.

The invention claimed is:

1. A method for detecting leaks, comprising:
using an AC voltage with a DC high voltage to inspect containers, such as ampoules, vials, syringes, pouches, flanges, aluminum pouches and any other containers filled with medicinal, food, and other products for defects such as leaks, pinholes, cracks, or seal defects in containers without contents and sealed, wherein 0.004 ppm of ozone is produced when −18.5 $kV_{Pk}$ is applied over 5 minutes.

2. The method of claim 1, further comprising reducing the amount of voltage applied to a substance inside of the container.

3. The method of claim 1, further comprising increasing sensitivity of measured change in electrical current.

4. The method of claim 1, further comprising reducing production of ozone through leak detection testing.

5. A method for detecting leaks, comprising:
using an AC voltage with a DC high voltage to inspect containers, such as ampoules, vials, syringes, pouches, flanges, aluminum pouches and any other containers filled with medicinal, food, and other products for defects such as leaks, pinholes, cracks, or seal defects in containers without contents and sealed, wherein only $-300$ $V_{Pk}$ is measured inside of a non-defective container when $-18.5$ $kV_{Pk}$ is applied.

6. Th method of claim 5, further comprising reducing the amount of voltage applied to a substance inside of the container.

7. The method of claim 5, further comprising increasing sensitivity of measured change in electrical current.

8. The method of claim 5, further comprising reducing production of ozone through leak detection testing.

9. A method for detecting leaks, comprising:
using an AC voltage with a DC high voltage to inspect containers, such as ampoules, vials, syringes, pouches, flanges, aluminum pouches and any other containers filled with medicinal, food, and other products for defects such as leaks, pinholes, cracks, or seal defects in containers without contents and sealed, wherein a ratio of signal levels for a container with defective seal and a container without defective seal is 7.7V/2.2V=3.5, when $-12$ $kV_{Pk}$ is applied.

10. Th method of claim 9, further comprising reducing the amount of voltage applied to a substance inside of the container.

11. The method of claim 9, further comprising increasing sensitivity of measured change in electrical current.

12. The method of claim 9, further comprising reducing production of ozone through leak detection testing.

* * * * *